United States Patent
Summerfield et al.

(10) Patent No.: US 11,671,130 B2
(45) Date of Patent: Jun. 6, 2023

(54) OBTAINING RELIABLE AND SPECIFIC DATA FOR ADAPTIVE DIGITAL PREDISTORTION

(71) Applicant: Analog Devices International Unlimited Company, Limerick (IE)

(72) Inventors: Stephen Summerfield, Santa Clara, CA (US); Praveen Chandrasekaran, Bangalore (IN); Christopher Mayer, Dover, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/537,724

(22) Filed: Nov. 30, 2021

(65) Prior Publication Data

US 2022/0190852 A1    Jun. 16, 2022

Related U.S. Application Data

(60) Provisional application No. 63/123,573, filed on Dec. 10, 2020.

(51) Int. Cl.
*H04B 1/04*    (2006.01)

(52) U.S. Cl.
CPC ... *H04B 1/0475* (2013.01); *H04B 2001/0425* (2013.01)

(58) Field of Classification Search
CPC .................. H04B 1/0475; H04B 2001/0425; H04B 1/62; H04B 2001/0433; H04B 1/04
USPC .................................................. 375/295–297
See application file for complete search history.

(56) References Cited

U.S. PATENT DOCUMENTS

| | | | |
|---|---|---|---|
| 9,287,833 B2 | 3/2016 | Peroulas et al. | |
| 9,374,112 B2 | 6/2016 | Yang et al. | |
| 10,243,596 B1 * | 3/2019 | Kerhuel | H04L 27/2646 |
| 10,693,509 B1 | 6/2020 | Summerfield | |
| 11,283,666 B1 * | 3/2022 | McCormick | H03F 3/245 |
| 2008/0157819 A1 * | 7/2008 | Bhandari | H04L 25/03343 327/33 |
| 2008/0157869 A1 | 7/2008 | Bhandari et al. | |
| 2010/0225390 A1 * | 9/2010 | Brown | H03F 1/3247 703/2 |

(Continued)

*Primary Examiner* — Emmanuel Bayard
(74) *Attorney, Agent, or Firm* — Knobbe, Martens, Olson & Bear, LLP

(57) ABSTRACT

Systems, devices, and methods related to performing digital predistortion in radio frequency (RF) systems are provided. A digital predistortion (DPD) arrangement includes a DPD actuator circuit to predistort, using DPD coefficients, at least a portion of an input signal, the DPD coefficients associated with a characteristic of a nonlinear component. The DPD arrangement further includes a DPD capture circuit to perform, based on a capture cycle timing, multiple captures of a feedback signal, the feedback signal indicative of an output of the nonlinear component; compute, based on one or more characteristics of the multiple captures, one or more criteria for a subsequent capture of the feedback signal; and perform, based on the one or more criteria, the subsequent capture of the feedback signal. The DPD arrangement circuit further includes a DPD adaptation circuit to update the DPD coefficients based at least in part on the subsequent capture.

20 Claims, 9 Drawing Sheets

(56) References Cited

U.S. PATENT DOCUMENTS

| | | | |
|---|---|---|---|
| 2016/0065249 A1* | 3/2016 | Yang | H03F 1/3241 |
| | | | 375/297 |
| 2021/0152201 A1* | 5/2021 | Megretski | H03F 3/245 |
| 2021/0359896 A1* | 11/2021 | Nayebi | H04L 27/3863 |
| 2022/0052653 A1* | 2/2022 | Pratt | H03F 1/3252 |

* cited by examiner

OBTAINING RELIABLE AND SPECIFIC DATA FOR ADAPTIVE DIGITAL PREDISTORTION

CROSS REFERENCE TO RELATED APPLICATIONS

The present application claims priority to and the benefit of the U.S. Provisional Patent Application No. 63/123,573 entitled "OBTAINING RELIABLE AND SPECIFIC DATA FOR ADAPTIVE DIGITAL PREDISTORTION" and filed Dec. 10, 2020, which is hereby incorporated by reference in its entirety as if fully set forth below and for all applicable purposes.

TECHNICAL FIELD OF THE DISCLOSURE

The present disclosure generally relates to electronics, and, more specifically, to performing digital predistortion in radio frequency (RF) systems.

BACKGROUND

Radio systems are systems that transmit and receive signals in the form of electromagnetic waves in the RF range of approximately 3 kilohertz (kHz) to 300 gigahertz (GHz). Radio systems are commonly used for wireless communications, with cellular/wireless mobile technology being a prominent example but may also be used for cable communications such as cable television. In both of these types of systems, linearity of various components therein plays a crucial role.

Linearity of an RF component or a system such as an RF transceiver is easy to understand in theory. Namely, linearity generally refers to the ability of a component or a system to provide an output signal that is directly proportional to an input signal. In other words, if a component or a system is perfectly linear, the relationship of a ratio of the output signal to the input signal is a straight line. Achieving this behavior in real-life components and systems is far more complicated and many challenges to linearity must be resolved, often at the expense of some other performance parameter, such as efficiency and/or output power.

Made from semiconductor materials, which are inherently nonlinear, and having to operate at relatively high power levels, power amplifiers (PAs) are usually the first components to analyze when considering a design of an RF system in terms of linearity. PA outputs with nonlinear distortions can result in reduced modulation accuracy (e.g., reduced error vector magnitude (EVM)) and/or out-of-band emissions. Therefore, both wireless RF systems (e.g., Long-Term Evolution (LTE) and millimeter-wave or $5^{th}$ generation (5G) systems) and cable RF systems have stringent specifications on PA linearity.

Digital predistortion (DPD) can be applied to enhance linearity of a PA. Typically, DPD involves applying, in the digital domain, predistortion to a signal to be provided as an input to a PA to reduce and/or cancel distortion that is expected to be caused by the PA. The predistortion can be characterized by a PA model. The PA model can be updated based on a feedback signal from the PA (i.e., based on the output of the PA). The more accurate a PA model is in terms of predicting the distortions that the PA will introduce, the more effective the predistortion of an input to the PA will be in terms of reducing the effects of the distortion caused by the amplifier.

Obtaining an accurate PA model that may be used to perform DPD is not trivial and further improvements would be desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating DPD techniques proposed herein, it might be useful to first understand phenomena that may come into play in communication systems. The following foundational information may be viewed as a basis from which the present disclosure may be properly explained. Such information is offered for purposes of explanation only and, accordingly, should not be construed in any way to limit the broad scope of the present disclosure and its potential applications.

Solid-state devices that can be used in high-frequency applications are of great importance in modern semiconductor technologies. Due, in part, to their large band gap and high mobility, III-N based transistors (i.e., transistors that employ compound semiconductor materials with a first sub-lattice of at least one element from group III of the periodic table (e.g., Al, Ga, In) and a second sub-lattice of nitrogen (N) as channel materials), such as gallium nitride (GaN) based transistors, may be particularly advantageous for high-frequency applications. In particular, PAs may be built using GaN transistors.

While GaN transistor have desirable features in terms of cut-off frequency and efficiency, their behavior is complicated by an effect known at charge trapping, where defect sites in the transistor channel trap charge carriers. The density of trapped charges is largely dependent on the gate voltage, where the gate voltage is typically proportional to the signal amplitude. To complicate things further, an opposite effect may simultaneously compete with the effect of charge trapping. Namely, as some charge carriers are trapped by defect sites, other charge carriers are released from the traps, e.g., due to thermal activation. These two effects have very different time constants: the defect sites may be filled with trapped charges quickly any time the gate voltage is increased, while the release of trapped charges happens more slowly. The release time constants can be 10's of microseconds and up to milliseconds, with the effect typically being very visible on the time scale of the symbol periods in 4G or 5G data, especially for data that contains bursts.

Figure 1:
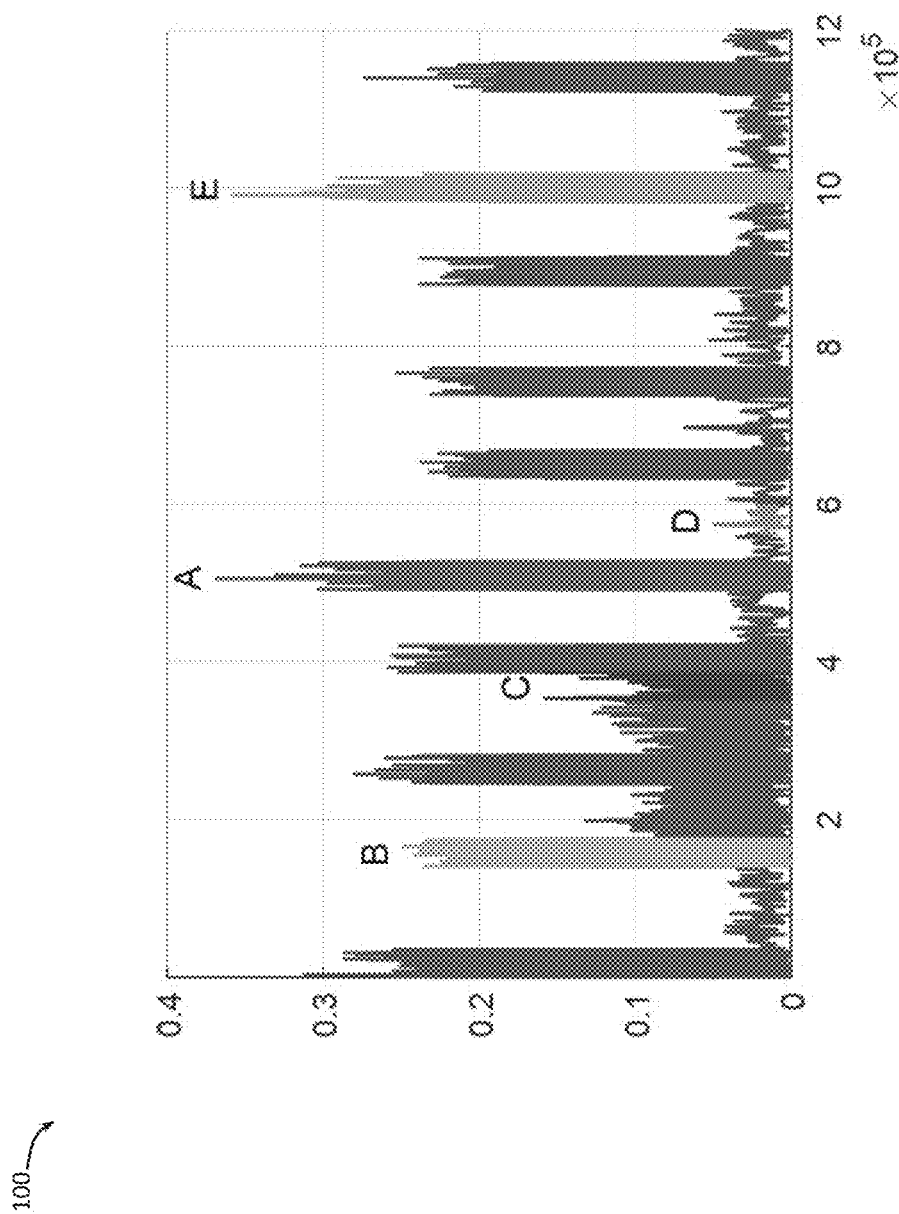
FIG. 1 illustrates data bursts in an example signal.
Figure 2:
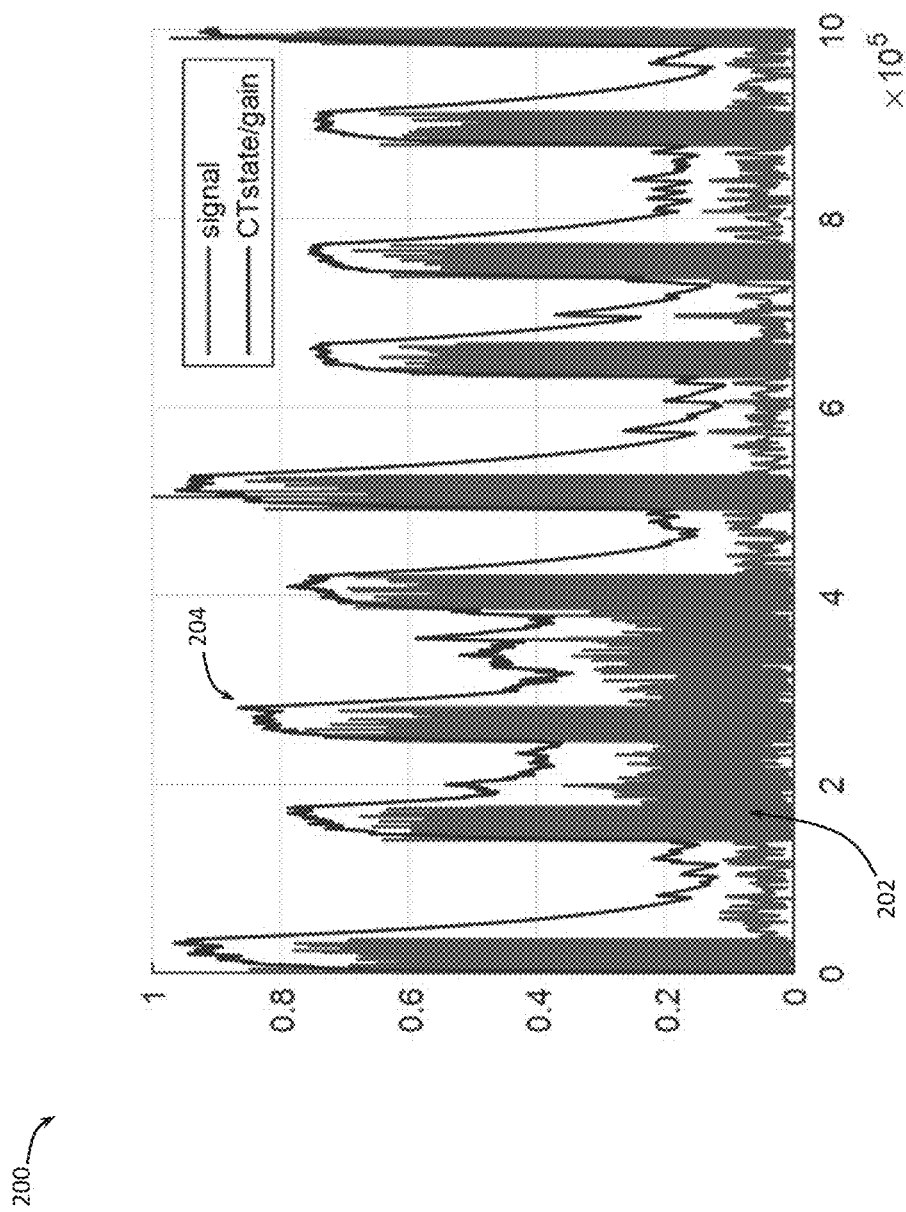
FIG. 2 illustrates how charge trapping can affect the gain in an example signal.
Figure 3:
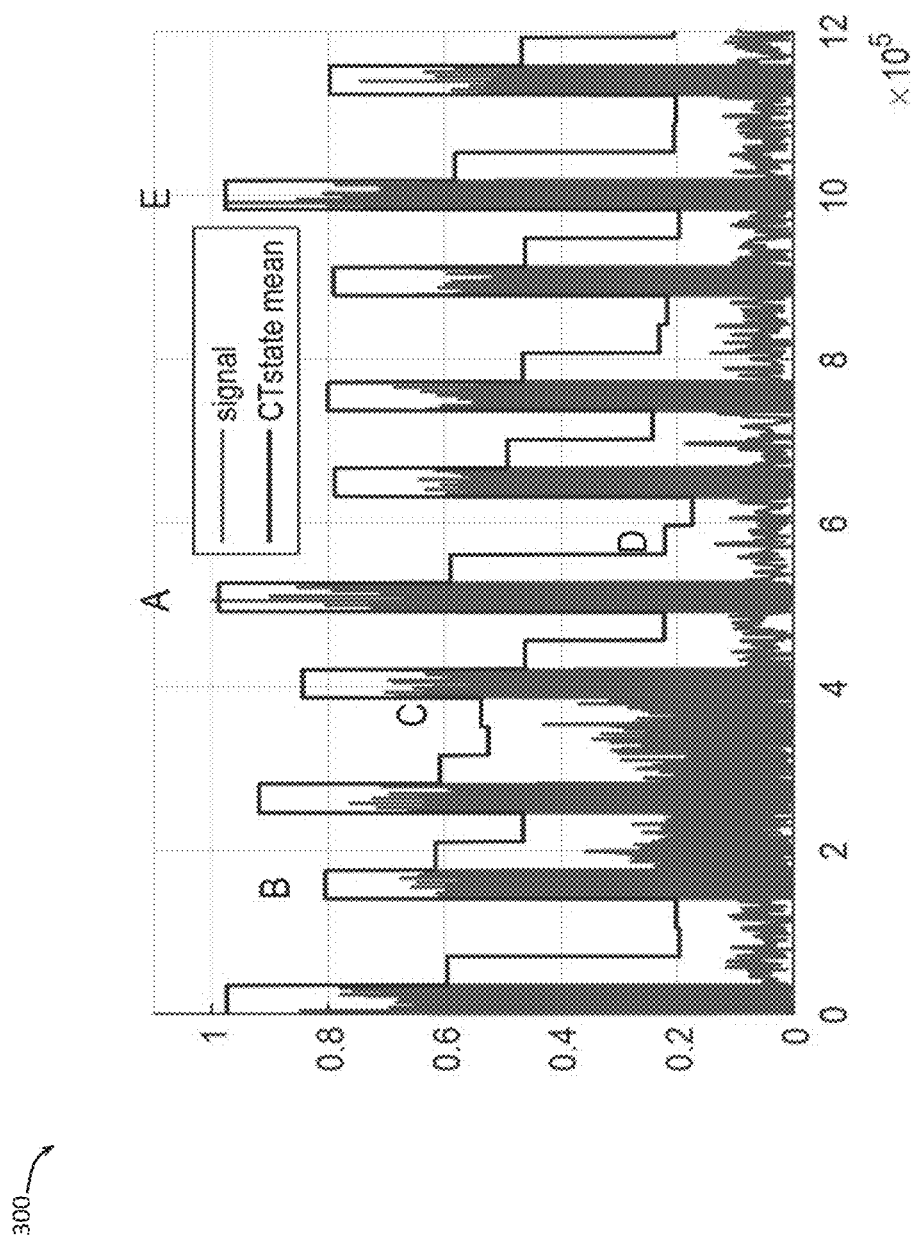
FIG. 3 illustrates an example signal and a charge trap (CT) model with the mean gain in each symbol period.

FIG. 1 provides an illustration 100, showing an example signal with data bursts. The horizontal axis of FIG. 1 indicates data samples of the signal, while the vertical axis indicates the signal amplitude. Letters A, B, C, D, and E, shown in FIG. 1, label peaks in various portions of the signal. FIG. 2 provides an illustration 200, showing an example signal with data bursts similar to that shown in FIG. 1, but now also illustrating how charge trapping can affect the gain in the signal. In particular, FIG. 2 shows an amplitude plot of a 4G standard test signal, labeled in FIG. 2 as a signal 202, known at ETM2 in the 3GPP standards. A curve 204, shown in FIG. 2 as an overlay over the amplitude plot of the signal 202, illustrates a typical expected behavior for the CT density/state. FIG. 2 illustrates that the CT state (i.e., the curve 204) rises rapidly every time there is a power burst (i.e., every time there is a burst in the signal 202 where the amplitude of the signal 202 sharply increases) and then decays slowly in the regions where the signal 202 is of relatively low power. The charge in the traps acts to oppose the effect of the applied gate voltage to the transistor channel and is, thus, manifested macroscopically as a modulation of the gain of the transistor. FIG. 3 provides an illustration 300, showing an example signal and a CT model with the mean gain in each symbol period. As can be seen from FIG. 3, the mean gain varies in different portions of the signal. It is this dynamic gain change that affects the signal quality in GaN PAs.

The signal quality is the measure of how closely the amplifier is linear, i.e., of how closely the signal that is transmitted from the output of the PA matches the signal that is provided to the input of the PA. The signal 202 shown in FIG. 2 may be seen as an illustration of a signal provided to the input of the PA, while the signal 204 shown in FIG. 2 provides an illustration of how a signal at the output of the PA would change, compared to the input signal, because of the effects within the PA. FIG. 2 illustrates that the relatively fast charge trapping and the relatively slow charge release in a GaN PA may distort the input signal to the PA in a nonlinear manner, resulting in a distorted signal at the output of the amplifier.

As described above, DPD can pre-distort an input to a PA to reduce and/or cancel distortion caused by the amplifier. To that end, at a high level, DPD involves forming a model of how a PA may affect an input signal, the model defining coefficients of a filter, or gain, to be applied to the input signal in an attempt to reduce and/or cancel the distortion of the input signal caused by the amplifier. In this manner, DPD will try to compensate for a nonlinear gain of the amplifier, by applying a corresponding gain to the input signal, where typically one gain is applied at any one signal amplitude.

The model used in DPD algorithms is an adaptive model, meaning that it is formed in an iterative process by gradually adjusting the coefficients based on the comparison between the data that comes into the input to the amplifier and the data that comes out from the output of the amplifier. Estimation of DPD coefficients is based on captures of a finite sequence of input and output data (i.e., input to and output from a PA).

One aspect of the present disclosure provides a DPD capture unit configured to offer multiple configurable modes for capturing feedback signals from a PA. Such a DPD capture unit is referred to as a "multi-mode DPD capture circuit." In mode 1, the peak sample power in a certain window is presented substantially in the center of a capture buffer. In mode 2, the peak window start may be synchronized with a frame at a programmed offset. In mode 3, data may be decimated prior to capture. In mode 4, multiple capture cycles may be performed in a quick succession (in a "burst mode") to compute certain statistical characteristics of data. Such capture cycles of samples of a feedback signal may be referred to as "trial captures" and each trial capture may include L consecutive samples of the feedback signal. The statistical collected characteristics may then be used to set conditions for acquiring non-trial captures (i.e., for performing acquiring the captures to be used in updating a PA model). In an operational variation of mode 4, the non-trial captures may be collected. A burst mode may be configured as in mode 4 and the burst may be terminated when the conditions set following a mode 4 burst are met in a capture sample. The conditions that are to be met for the acquisition of the capture may be logical combinations of threshold comparisons on the characteristics of the statistics. In mode 5, the samples are accumulated over multiple captures in order to perform averaging to reduce noise. Captures collected by the DPD capture unit may be used to update a PA model, which model may be used to apply digital predistortion to an input signal. Having a multi-mode DPD capture circuit offering multiple configurable modes allows for combinations of timing and signal condition selection that can be adapted to the requirements of various DPD algorithms such that reliable and specific data may be captured for performing adaptive DPD, thus providing provides for a stable and accurate estimation of DPD coefficients.

While some of the descriptions are provided herein with reference to GaN based PAs, in general, various embodiments of the methods of digital predistortion with power-specific capture selection presented herein are applicable to PAs which are not GaN based, as well as to any nonlinear electronic components (i.e., components that may exhibit nonlinear behavior) other than PAs.

Various embodiments of performing DPD using a multi-mode DPD capture circuit are explained herein with reference to the "input signals for PAs" being drive signals for the PAs, i.e., signals generated on the basis of the input signals x, described herein, to which the DPD arrangement applies predistortion based on the DPD coefficients. However, in other embodiments of DPD using a multi-mode DPD capture circuit as described herein, the "input signals for PAs" may be bias signals used to bias the PAs. Thus, embodiments of the present disclosure include DPD arrangements similar to the ones described herein and illustrated in the drawings, except that, instead of modifying the drive signals for the PAs, DPD circuit may be configured to modify the bias signals for the PAs, which may be done based on control signals generated by a DPD adaptation circuit (e.g., the DPD adaptation circuit 414, described herein). The output of the PA array is based on the bias signals used to bias the array of PAs individually or collectively. In other aspects of the present disclosure, both drive signals and bias signals for the PA array may be adjusted as described herein to implement of DPD using a multi-mode DPD capture circuit as described herein.

Furthermore, while some of the descriptions are provided herein with reference to PAs, in general, various embodiments of DPD using a multi-mode DPD capture circuit, presented herein, are applicable to amplifiers other than PAs, such as low-noise amplifiers, variable gain amplifiers, etc., as well as to nonlinear electronic components of RF transceivers (i.e., components that may exhibit nonlinear behavior) other than amplifiers. Furthermore, while some of the descriptions are provided herein with reference to wireless communication systems of millimeter-wave/5G technologies, in general, various embodiments of DPD using a multi-mode DPD capture circuit, presented herein, are applicable to wireless communication systems of any technology or standard other than millimeter-wave/5G, and/or to any wireless RF systems other than wireless communication systems, and/or to any RF systems other than wireless systems.

As will be appreciated by one skilled in the art, aspects of the present disclosure, in particular aspects of RF transceivers with DPD using a multi-mode DPD capture circuit as described herein, may be embodied in various manners— e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "arrangement," "module," or "system." At least some of the functions described in this disclosure may be implemented as an algorithm executed by one or more hardware processing units, e.g. one or more microprocessors, of one or more computers. In various embodiments, different steps, and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to various devices and systems (e.g. to various components and arrangements of components of RF transceivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Sometimes, in the present descriptions, the term "circuit" may be omitted (e.g., a DPD actuator circuit 412 shown in the present drawings may be referred to in the present descriptions as a "DPD actuator 412," etc.). If used, the terms "substantially," "approximately," "about," etc., may be used to generally refer to being within +/−20% of a target value, e.g., within +/−10% of a target value, based on the context of a particular value as described herein or as known in the art.

Example Communication System with a Multi-Mode DPD Capture Circuit

As summarized above, embodiments of the present disclosure relate to performing DPD with capture acquisition performed by a multi-mode DPD capture circuit. To that end, a system as shown in FIG. 4 may be used.

Figure 4:
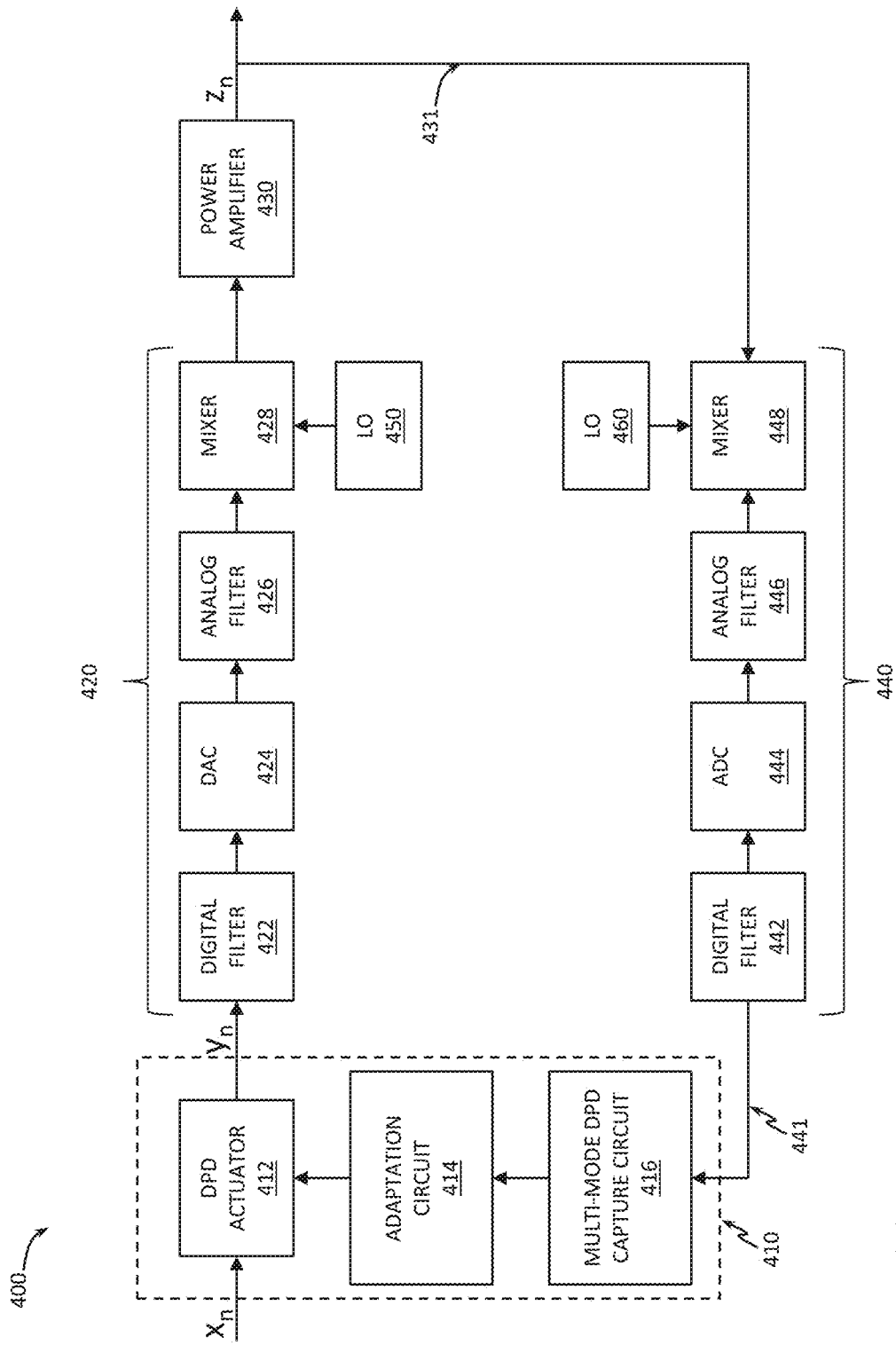
FIG. 4 illustrates a schematic block diagram of a communication system with a multi-mode DPD capture circuit, according to some embodiments of the present disclosure.

FIG. 4 illustrates a schematic block diagram of a communication system 400 with a DPD circuit 410 configured to implement multi-mode capture acquisition, according to some embodiments of the present disclosure. FIG. 4 illustrates that the communication system 400 may include a transmitter circuit (or, simply, a "transmitter") 420 in communication with the DPD circuit 410, and a PA 430 in communication with the transmitter 420. The output from the PA may be provided, as a feedback signal, to a receiver circuit (or, simply, a "receiver") 440 that is also in communication with the DPD circuit 410.

As shown in FIG. 4, the DPD circuit 410 may include a DPD actuator 412, an adaptation circuit 414, and a multi-mode DPD capture circuit 416. The transmitter 420 may include a digital filter 422, a digital-to-analog converter (DAC) 424, an analog filter 426, and a mixer 428. The receiver 440 may include a digital filter 442, an analog-to-digital converter (ADC) 444, an analog filter 446, and a mixer 448. In various embodiments, the communications system 400 can include fewer or more elements than those illustrated in FIG. 4.

An input signal X (labeled in FIG. 4 as $x_n$, referring to a sequence of digital samples of the signal X) may be received by the DPD actuator 412. In some embodiments, the input signal X may include one or more active channels in the frequency domain. In some embodiments, the input signal X may be a baseband digital signal. The DPD actuator 412 may be configured to pre-distort the input signal X based on predistortion coefficients α provided by the DPD adaptation circuit 414. In turn, the DPD adaptation circuit 414 may be configured to generate the predistortion coefficients based on a model that the DPD adaptation circuit 414 updates based on captures acquired by the multi-mode DPD capture circuit 416, described in greater detail below. The DPD actuator 412 can provide the predistorted input Y (labeled in FIG. 4 as $y_n$, referring to a sequence of digital samples of the signal Y), which is the input signal X to which predistortion has been applied, to the transmitter 420. The DPD actuator 412 can be implemented by any suitable circuits. For instance, in some embodiments, the DPD actuator 412 can be implemented by combinational logic circuits.

It should be noted that, while a differentiation between the adaptation circuit 414 and the multi-mode DPD capture circuit 416 is made in the illustration of these circuits in the drawings and in the descriptions of these circuits, this differentiation may be only logical, to differentiate functions that may be performed by a conventional DPD circuit (described herein with reference to the adaptation circuit 414) and functions specifically related to multi-mode capture selection (described herein with reference to the multi-mode DPD capture circuit 416). In various embodiments, functionality of the multi-mode DPD capture circuit 416 may be included in, or be considered as a part of, the adaptation circuit 414, or functionalities of these two circuits may be spread over a larger number of individual circuits.

The transmitter 420 may be configured to upconvert the predistorted input Y from a baseband signal to a higher frequency signal, such as an RF signal. In the illustrated transmitter 420, the predistorted input Y may be filtered in the digital domain by the digital filter 422 to generate a filtered predistorted input Y, a digital signal. The output of the digital filter 422 may then be converted to an analog signal by the DAC 424. The analog signal provided by the DAC 424 may then be filtered by an analog filter 426. The output of the analog filter 426 may then be upconverted to RF by the mixer 428, which may receive a signal from a local oscillator 450 to translate the filtered analog signal from the analog filter 426 from baseband to RF. Other methods of implementing the transmitter 420 are also possible and within the scope of the present disclosure. For instance, in another implementation (not illustrated) the output of the digital filter 422 can be directly converted to an RF signal by the DAC 424. In such an implementation, the RF signal provided by the DAC 424 can then be filtered by the analog filter 426. Since the DAC 424 would directly synthesize the RF signal in this implementation, the mixer 428 and the local oscillator 450 illustrated in FIG. 4 can be omitted from the system 400 in such embodiments.

As further illustrated in FIG. 4, the RF signal generated by the transmitter 420 is provided to the PA 430. The PA 430 amplifies the RF signal and provides an amplified RF signal Z (labeled in FIG. 4 as $z_n$, referring to a sequence of analog values of the signal Z). The amplified RF signal Z can be provided to an antenna (not illustrated in FIG. 4) to be wirelessly transmitted. The amplified RF signal Z has a signal bandwidth. The signal bandwidth can be a wide bandwidth. As one non-limiting example, the signal bandwidth can be about 1 GHz. The amplified RF signal Z is an amplified version of the input signal X. However, as discussed above, the amplified RF signal Z can have distortions outside of the main signal components. Such distortions can result from nonlinearities in the response of the PA 430. As discussed above, it can be desirable to reduce such nonlinearities. Accordingly, feedback from the output of the PA 430 can be provided to the DPD circuit 410 by way of the receiver 440. The DPD circuit 410 can use the feedback from the PA 430 to adjust the predistortion applied to the input signal X to reduce the nonlinearities in the response of the PA 430.

To provide feedback to the DPD circuit 410, at least a portion 431 of the amplified RF signal Z can be provided to the receiver 440. For example, in some embodiments, a feedback element (not illustrated) may be used in the signal path between the output of the PA 430 and the receiver 440, e.g., a resistive element that feeds back a relatively small portion of the amplified RF signal to the receiver 440. In some other embodiments (also not illustrated), a directional coupler or other suitable circuit can provide a portion of the amplified RF signal Z to the receiver 440. In some embodiments (not illustrated), a feedback filter may be provided in the signal path between the output of the PA 430 and the receiver 440, e.g., to filter the feedback signal 431 and provide the filtered signal as a feedback signal to the receiver 440 for processing. The feedback signal 431 provided to the receiver 440 can have approximately the same bandwidth as the amplified RF signal Z.

In some embodiments, the receiver 440 is configured to perform diagnostics and/or equalization. Accordingly, the receiver 440 can be utilized for providing feedback to the DPD circuit 410 and for diagnostics and/or equalization in such embodiments. In the illustrated receiver 440, the feedback signal 431 may be downconverted to the baseband by the mixer 448, which may receive a signal from a local oscillator 460 (which may be the same or different from the local oscillator 450) to translate the feedback signal 431 from the RF to the baseband. The output of the mixer 448 may then be filtered by the analog filter 446. The output of the analog filter 446 may then be converted to a digital signal by the ADC 444. The digital signal generated by the ADC 444 may then be filtered in the digital domain by the digital filter 442 to generate a filtered downconverted digital feedback signal 441 which may be provided to the DPD circuit 410. Other methods of implementing the receiver 440 are also possible and within the scope of the present disclosure. For instance, in another implementation (not illustrated) the RF feedback signal 431 can be directly converted to a baseband signal by the ADC 444. In such an implementation, the downconverted signal provided by the ADC 444 can then be filtered by the digital filter 442. Since the ADC 444 would directly synthesize the baseband signal in this implementation, the mixer 448 and the local oscillator 460 illustrated in FIG. 4 can be omitted from the system 400 in such embodiments.

Further variations are possible to the system 400, described above. For example, while upconversion and downconversion is described with respect to the baseband frequency, in other embodiments of the system 400, an intermediate frequency (IF) may be used instead. IF may be used in superheterodyne radio receivers, in which a received RF signal is shifted to an IF, before the final detection of the information in the received signal is done. Conversion to an IF may be useful for several reasons. For example, when several stages of filters are used, they can all be set to a fixed frequency, which makes them easier to build and to tune. In some embodiments, the mixers of RF transmitter 420 or the receiver 440 may include several such stages of IF conversion. In another example, although a single path mixer is shown in each of the transmit (TX) path (i.e., the signal path for the signal to be processed by the transmitter 420) and the receive (RX) path (i.e., the signal path for the signal to be processed by the receiver 440) of FIG. 4, in some embodiments, the TX path mixer 428 and the RX path mixer 448 may be implemented as a quadrature upconverter and downconverter, respectively, in which case each of them would include a first mixer and a second mixer. For example, for the RX path mixer 448, the first RX path mixer may be configured for performing downconversion to generate an in-phase (I) downconverted RX signal by mixing the feedback signal 431 and an in-phase component of the local oscillator signal provided by the local oscillator 460. The second RX path mixer may be configured for performing downconversion to generate a quadrature (Q) downconverted RX signal by mixing the feedback signal 431 and a quadrature component of the local oscillator signal provided by the local oscillator 460 (the quadrature component is a component that is offset, in phase, from the in-phase component of the local oscillator signal by 90 degrees). The output of the first RX path mixer may be provided to a I-signal path, and the output of the second RX path mixer may be provided to a Q-signal path, which may be substantially 90 degrees out of phase with the I-signal path.

Obtaining Reliable and Specific Data Using a Multi-Mode DPD Capture Circuit

Turning to the details of the DPD circuit 410, functionality of performing DPD using a multi-mode DPD capture circuit according to various embodiments of the present disclosure may be illustrated with reference to FIG. 5, providing a schematic illustration of a part of a communication system 500, e.g., a part of the communication system 400, that includes the multi-mode DPD capture circuit 416 and capture buffers 502.

Figure 6:
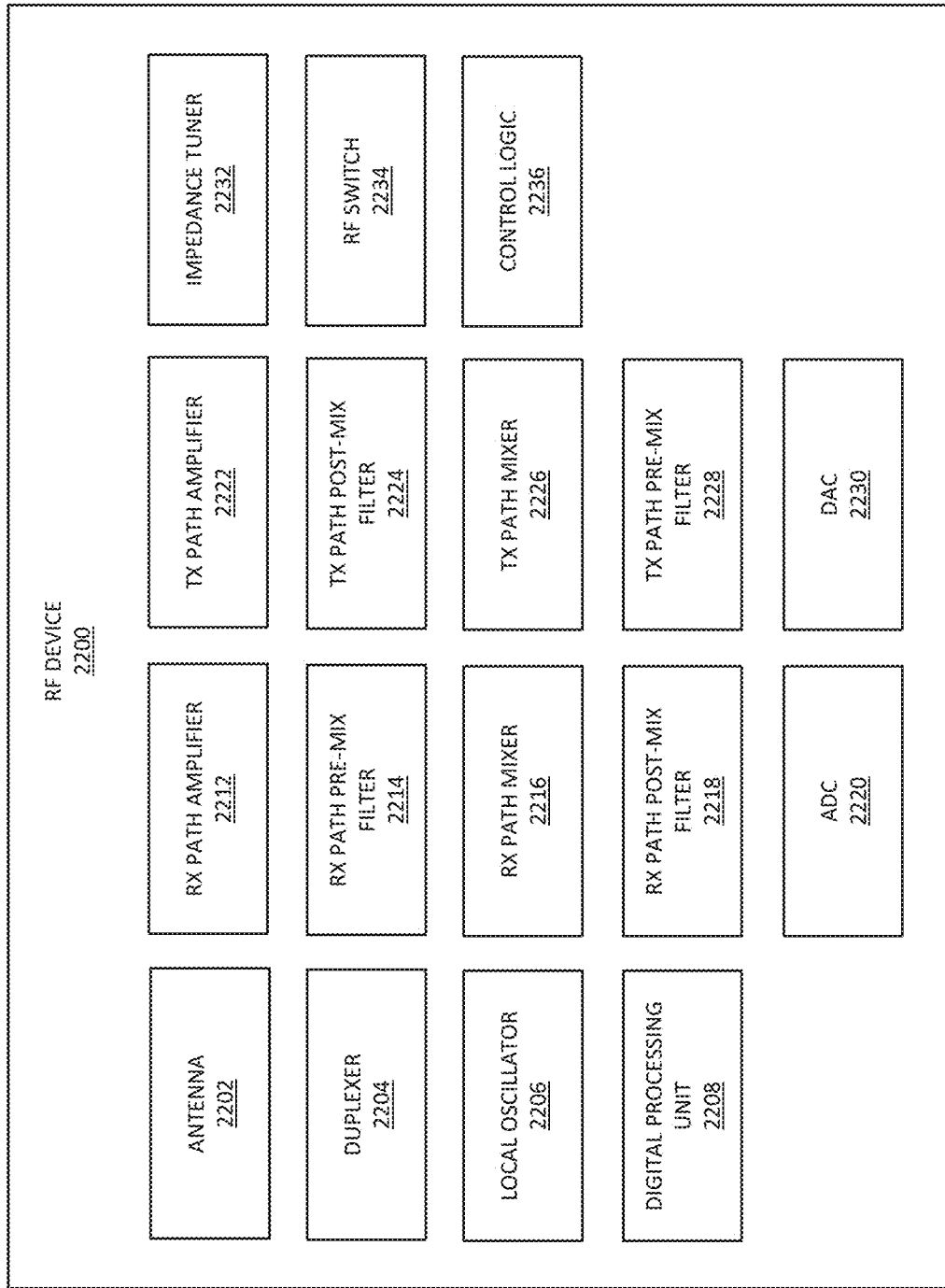
FIG. 6 provides a schematic block diagram illustrating an RF system in which DPD using a multi-mode DPD capture circuit may be implemented, according to some embodiments of the present disclosure.
Figure 7:
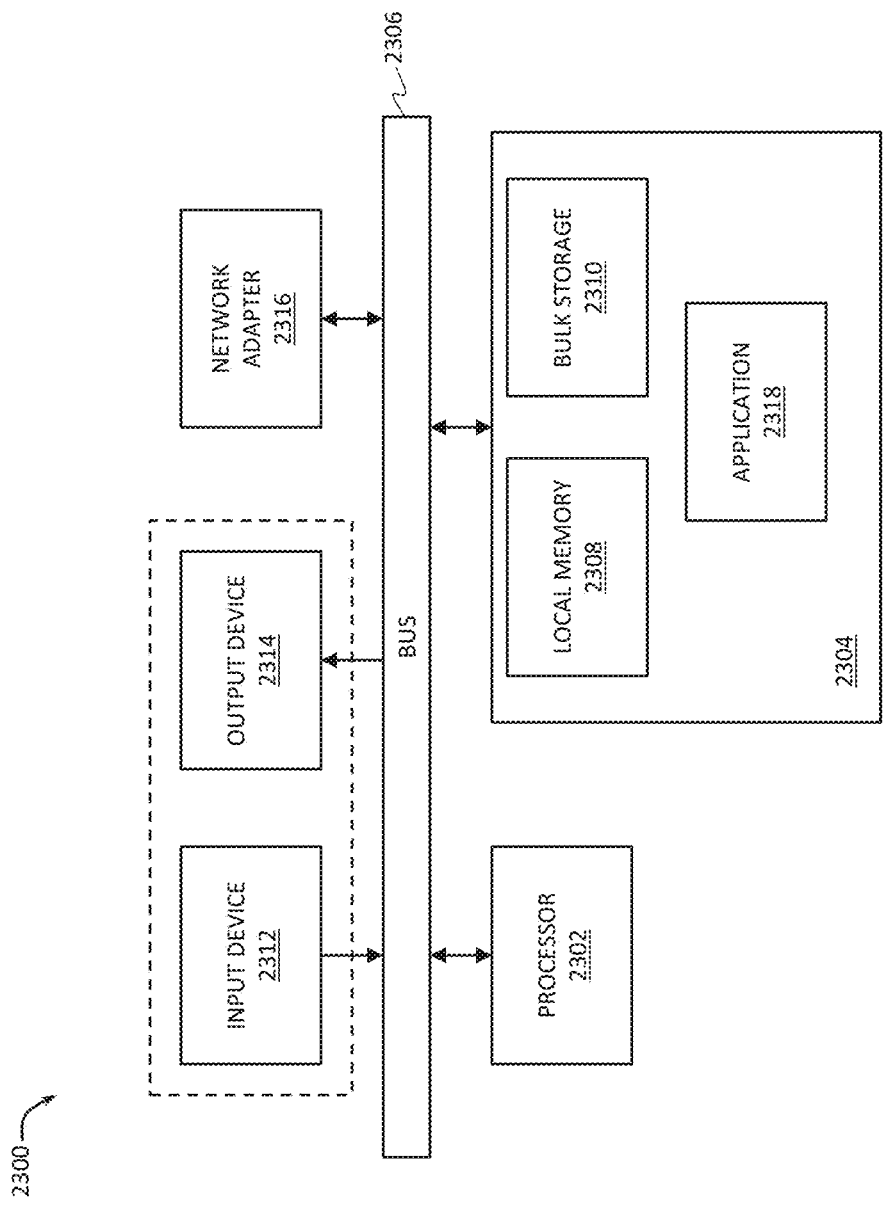
FIG. 7 provides a block diagram illustrating an example data processing system that may be configured to implement, or control, at least portions of performing DPD using a multi-mode DPD capture circuit, according to some embodiments of the present disclosure.

In some embodiments, the multi-mode DPD capture circuit 416 may be a hardware unit that includes suitable memory (e.g., random-access memory (RAM)) and supporting arithmetic and logic functions. In some embodiments, the multi-mode DPD capture circuit 416 may include at least portions of a data processing system as shown in FIG. 7. The multi-mode DPD capture circuit 416 may be configured to capture data for use in DPD estimation of DPD coefficients from selectable nodes in a radio transceiver device, e.g., in a device as shown in FIG. 4 and/or a device as shown in FIG. 6. The multi-mode DPD capture circuit 416 has multiple configurable modes that allow for combinations of timing and signal condition selection that can be adapted to the requirements of various DPD algorithms such that the data collected provides for a stable and accurate estimation.

In cellular radio standards the radio transmission is normally divided into frames, typically of 10 milliseconds (ms) duration. Each frame may then be divided into subframes, timeslots, and symbols. For example, a 4G frequency domain duplex (FDD) frame typically includes 10 subframes, each subframe including 14 symbol periods. Although the data being transmitted by a communication system is dynamic, there is, for the most part, similarity between successive frames. Ideally, DPD should sample one or more frames in their entirety for an accurate model, but for economy of complexity, DPD estimation must be based on data samples of a duration that is shorter than an entire frame. Therefore, carefully selecting portions of a feedback signal from which captures will be acquired for DPD estimation is important to ensure performance and stability. Embodiments of the present disclosure are based on recognition that a variety of signal conditions and performance targets are to be accounted for in selecting captures to be used by the DPD adaptation circuit 414 for DPD estimation.

Figure 5:
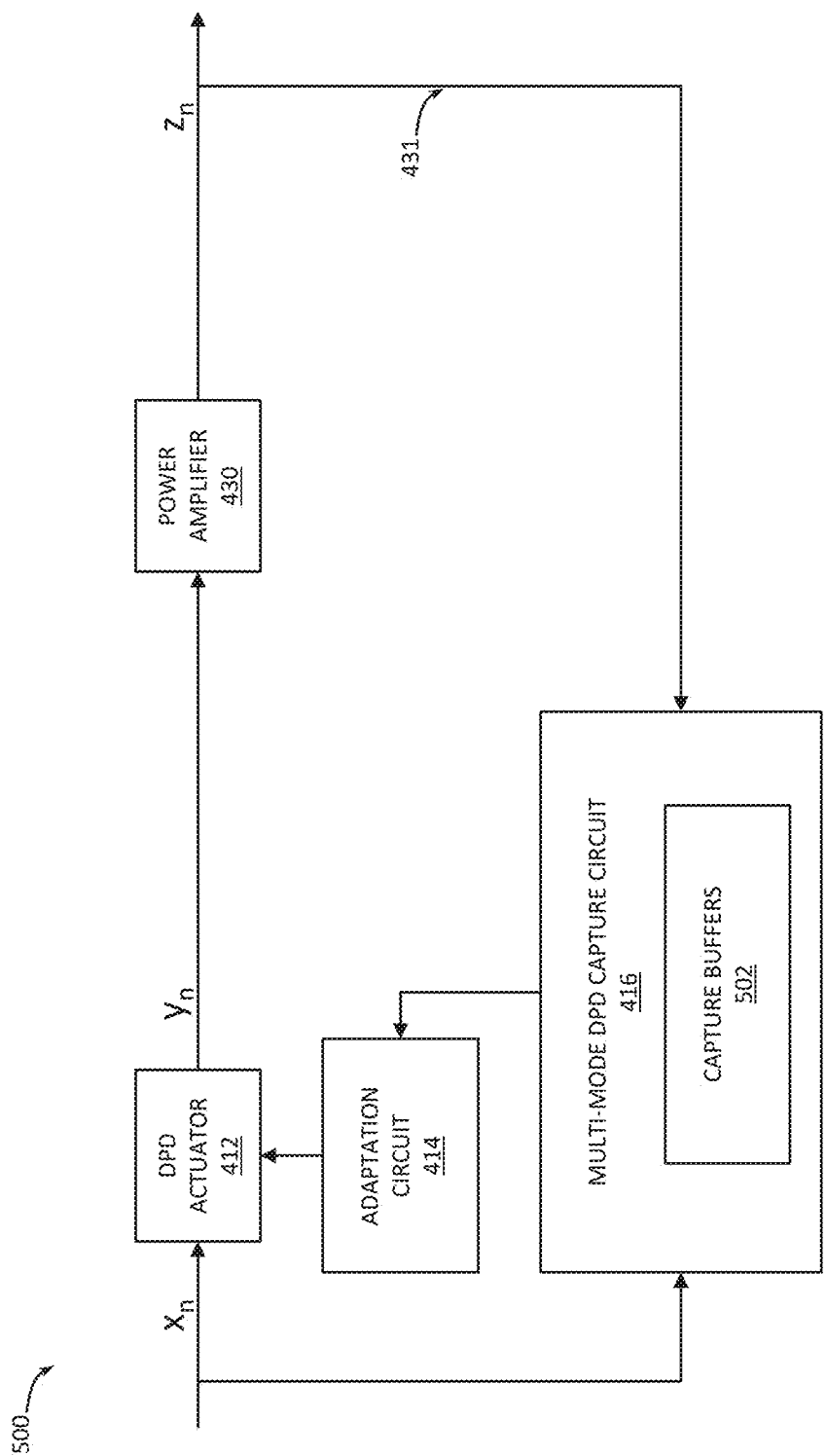
FIG. 5 illustrates a schematic block diagram of a part of a communication system with a multi-mode DPD capture circuit and capture buffers, according to some embodiments of the present disclosure.

The major blocks of an adaptive DPD system are shown in FIG. 5. In the illustration of FIG. 5, analog conversion functions are implicit, so each data line represents digital signals. The capture buffers 502 may be configured to store samples of two or more of the digital signals shown. For example, the capture buffers 502 may store samples of the input signal X and of the feedback signal 431 (Z). The data points stored in the capture buffers 502 may depend on the DPD model implemented by the DPD adaptation circuit 414 to compute the DPD coefficients. Because of the high sample rate of the signals to be stored in the capture buffers 502 and, hence, the cost of the memory unit used to implement the capture buffers 502 (e.g., RAM), each buffer of the capture buffers 502 may be limited in size, e.g., limited to being 4 kilobytes (Kbytes) or 8 Kbytes deep. Therefore, the time span of a capture can be only on the order of tens of microseconds (us) out of the entire duration of a frame. However multiple captures, e.g., 4 or 8 captures, may be taken and aggregated for one DPD estimation.

Embodiments of the present disclosure covers a design of a multi-mode DPD capture circuit 416 that has multiple modes that support different objectives. The modes and the rationale for each mode are described below. While 5 modes are described, in various embodiments, the multi-mode DPD capture circuit 416 may be configured to implement any combination of 2 or more of these modes.

In mode 1, which may be referred to as a "centering mode," the multi-mode DPD capture circuit 416 may be configured to present the peak sample power in a certain window substantially in the center of a capture buffer. The DPD estimation process is in part a curve-fitting exercise. In order to prevent extrapolation which may lead to inaccuracy, the sampled data should include the peak power to be expected for the lifetime of the estimation. The best guess at this is the highest peaks that have occurred in recent history. In mode 1, the multi-mode DPD capture circuit 416 may be configured to detect the highest peak occurring in a programmable time window (which may be referred to as a "peak search window") and center the peak in the middle of the capture buffer 502. In some embodiments, this may be implemented by the multi-mode DPD capture circuit 416 analyzing a certain window of data samples of the feedback signal 441, identifying the peak power value within that window of data samples, and creating an initialization signal for a capture buffer address counter that enables writing successive samples to the buffer. In some embodiments, a delay line equal to about half the buffer size may be inserted in the signal path so that the peak power sample is centered. As a result of this operation, the peak power value will be substantially in the center of the capture buffer. Presenting the peak sample power substantially in the center of a capture buffer may be advantageous in terms of ensuring that the capture used for DPD estimation contains the signal peak and its side lobes so that the model estimated by the DPD function contains the optimal representation of the signal statistics in the vicinity of the peak, which may be desirable for precise and stable behavior. In a dynamic signal environment, the frequency content of the signal can vary. When this frequency content is such that the signal has a narrow bandwidth, the signal is spread out in the time domain. A peak in a narrow-bandwidth signal will have a wide main lobe and side lobes that extend out, so that centering the peak advantageously allows to collect as much of the signal's content as is possible in a capture of a finite length.

In mode 2, which may be referred to as a "frame synchronization mode," the multi-mode DPD capture circuit 416 may be configured to synchronize the start of a peak search window with a frame at a predefined programmable offset with respect to a certain trigger. In some embodiments, the trigger may be a synchronization signal indicating that a new frame starts. In other embodiments, the trigger may be based on a counter, e.g., a particular counter value being reached. In still other embodiments, the trigger may be based on a certain characteristic of a feedback signal being analyzed meeting predefined criteria (e.g., a peak power value reaching a predefined threshold). In some embodiments, the frame synchronization mode may include the multi-mode DPD capture circuit 416 starting a plurality of peak search windows with a frame at different time offsets with respect to one or more triggers. For example, in some embodiments of operating in mode 2, the multi-mode DPD capture circuit 416 may be configured to take multiple captures over the span of a radio frame, where the multiple captures may be timed with predefined programmable time offsets from the frame boundary (e.g., time offsets with respect to a synchronization signal indicating the start of a frame). Starting a capture at a predefined programmable time offset from the frame boundary has been used in conventional DPD implementations. In contrast to such implementations, in mode 2 the multi-mode DPD capture circuit 416 is configured to start the peak search window after such a predefined time offset (i.e., the multi-mode DPD capture circuit 416 may start searching for a peak after such a predefined time offset) and the capture will occur whenever the peak is found, e.g., centering the peak that was found substantially in the center of the capture, as described above. Thus, when operating in mode 2, the multi-mode DPD capture circuit 416 is configured to start a peak search window at a predefined programmable time offset from a frame boundary, but the capture itself may happen at a later point in time, depending on the data in the peak search window. This can also be done in combination with mode 1 so that at the predetermined frame time a peak search window is initiated. For example, taking 5 captures with windows of 2 ms each spaced by 2 ms apart will obtain 5 captures that include the peaks in 5 different frame regions. Such captures (with the cycle timing of 2 ms on and 2 ms off for 5 cycles of data capturing) may have different frequency and/or power content, enabling the multi-mode DPD capture circuit 416 to assemble a more fully representative data sample. The timed peak window captures can also be used to estimate different models for different sections of the frame in order to compensate for transient effects, for example at the onset of the transmit periods in time-domain duplex (TDD) frames.

In mode 3, which may be referred to as a "decimation mode," the multi-mode DPD capture circuit 416 may be configured to perform decimation/downsampling of data prior to capture, where the term "decimation" refers to the process of reducing the sampling rate. In order to model long-term effects such as charge trapping and thermal memory, larger time spans must be represented in the capture set. Because the capture buffers 502 are limited to a certain number of samples that they may store, representing larger time spans may be realized by the multi-mode DPD capture circuit 416 decimating the data before storing the data in the capture buffers 502. For example, for a 10 mS frame LTE signal, it may be desirable to use a capture of a time span of 1 ms in order to represent relatively long-term effects such as charge trapping and thermal memory. For a 500 MHz sample rate, this would mean that 500,000 samples need to be stored in the capture buffers 502. However, each of the capture buffers 502 may only be, e.g., 8 Kbytes deep, which is too little to store all of the desired data. By performing decimation at a rate of 64, the number of samples could be reduced to about 7.8K (500,000/64=7, 812.5) samples which would allow storing samples covering the desired time span in one of the capture buffers 502. In some conventional implementations, a digitized feedback signal is decimated in order to set the capture buffer to a fixed sample rate, namely that of the DPD actuator. In contrast to such implementations, in the decimation mode, the multi-mode DPD capture circuit 416 is configured to decimate not only the digitized feedback signal 441 but also the input signal X. In some embodiments, the sample rate of the DPD estimation to be adapted during live operation. In some embodiments, DPD actuator arrangements that include multiple actuators operating at difference sample rates can be constructed, which allow effects over both short- and long-time scales to be corrected. The decimation mode allows each of these actuators to be estimated using the same capture buffers circuits. Furthermore, in some embodiments, operation of the multi-mode DPD capture circuit 416 in mode 3 may be combined with operation in mode 2 so that different sections of the frame can be sampled to provide a more complete model of the variation in long-term behavior within the signal.

In mode 4, which may be referred to as a "burst mode," the multi-mode DPD capture circuit 416 may be configured to perform multiple capture cycles with specified timing to collect statistics of trial captures so that the multi-mode DPD capture circuit 416 or the DPD adaptation circuit 414 may use the collected statistics to set criteria for acquiring targeted captures, e.g., by setting thresholds for non-trial captures based on the collected statistics. For example, in some embodiments, the statistics may include one or more of peak power above a programmable threshold (an upper bound threshold peak power) in the range zero to maximum power, peak power below a programmable threshold (a lower bound threshold peak power) in the range zero to maximum power, mean power above a programmable threshold (an upper bound threshold mean power) in the range zero to maximum power, mean power below a programmable threshold (a lower bound threshold mean power) in the range zero to maximum power, number of samples of power exceeding a programmable threshold (an upper bound threshold number of samples) greater than another programmable threshold, number of samples of power exceeding a programmable threshold (a lower bound threshold number of samples) less than another programmable threshold, and so on. In some embodiments of the burst mode, the multi-mode DPD capture circuit 416 may be configured to repeat capture until a logical combination of threshold comparisons is true. Phrased differently, some embodiments of the burst mode may be seen as the multi-mode DPD capture circuit 416 being configured to keep "looking" at (monitoring) the feedback signal, without storing any captures, until some logical combination of one or more thresholds is true, and then is configured to start capturing (i.e., storing samples of the capture) when the logical combination of one or more thresholds becomes true (e.g., it could be implemented as mode 3 except that the WRITE operation to the capture buffer is enabled for mode 3 and disabled for the burst mode). The burst mode allows for statistics of expected captures to be obtained which are then used to set the thresholds for a capture targeted to a specific characteristic. Peak power, mean power and number of samples exceeding (or being below) some thresholds are possible measurements. For example, captures selected by peak power alone may be particularly advantageous for bursty signals with GaN PAs where the charge trapping is highly dependent on local peak power and DPD function may be weighted to allow for the variations along the frame. In another case mean power may be important when considering fast thermal effects. The number of samples over a threshold to exceed a specified amount may be useful to avoid weighting with zero- or low-power samples where signals include short length pulses. The various threshold tests can be combined to increase the probability of obtaining a reliable capture. The captures acquired in the burst mode may be referred to as "trial" to indicate that they are used to establish criteria (e.g., thresholds) for when non-trial captures are to be acquired from the feedback signal that is indicative of the output of the PA 430, and to indicate that these burst mode captures may or may not be used as captures based on which predistortion coefficients are computed later on. The signal output by the PA 430 may be an unknown and dynamic signal, in which case the criteria (e.g., thresholds) for when non-trial captures are to be acquired may need to be established at the beginning of operation of the system 400, and/or repeated intermittently. In some embodiments, each trial capture may include L consecutive samples of the digital feedback signal, while, in other embodiments, different trial captures may include different number of consecutive samples of the digital feedback signal. Stated differently, each trial capture may be acquired according to a capture cycle timing, for example, including on/off periods where each on period may correspond to the time for acquiring L consecutive samples followed by an off period, or alternatively, each on period may correspond to the time for acquiring a respective number of consecutive samples followed by an off period. In some embodiments, the multi-mode DPD capture circuit 416 may include an instantaneous power circuit configured to compute an instantaneous power of the acquired trial captures. Next, based on the computed instantaneous power, a peak location circuit of the multi-mode DPD capture circuit 416 may be configured to identify the highest peak in the instantaneous power signal for each of the trial captures. The instantaneous power of the highest peak of a given trial capture may then be labeled as the maximum power for the capture, and stored in memory (e.g., in memory described with reference to FIG. 7). In some embodiments, the criteria (e.g., thresholds) for when non-trial captures are to be acquired may be re-evaluated (i.e., re-established) during operation of the communication system 400 at some desired points in time, e.g., periodically, or when the DPD circuit 410 is triggered to do so. In some instances, the instantaneous power circuit and/or the peak location circuity may be generally referred to as a measurement circuit.

In some embodiments, operation of the multi-mode DPD capture circuit 416 in mode 4 may be combined with operation in mode 1 so that the acquired statistics pertain to captures with peak centered. Furthermore, in some embodiments, operation of the multi-mode DPD capture circuit 416 in mode 4 may be combined with operation in mode 2 so that the acquired statistics pertain to captures in specific parts of the frame (e.g., specific parts of a radio frame or specific subframes within a radio frame). In other words, the capture cycle timing may be specified (e.g., configured or programmed) such that captures are in specific parts of the frame. Still further, in some embodiments, operation of the multi-mode DPD capture circuit 416 in mode 4 may be combined with operation in mode 3 so that the acquired statistics pertain to decimated captures in specific parts of the frame.

In mode 5, which may be referred to as an "accumulation mode," the multi-mode DPD capture circuit 416 may be configured to accumulate samples are accumulated over multiple captures, e.g., in order to perform averaging to reduce noise. In this mode, the multi-mode DPD capture circuit 416 may be configured to capture repeated transmissions and accumulate these captures in order to average-out noise. In some embodiments, this mode may be used for pilot symbols and for some special measurement that involve a low energy calibration signal. For example, if the multi-mode DPD capture circuit 416 is configured to start a capture of L consecutive data samples of the digitized feedback signal 441 at a certain predefined offset with respect to a frame boundary (e.g., as indicated by a synchronization signal), then the multi-mode DPD capture circuit 416 operating in the accumulation mode would first accumulate a plurality of such captures, for different frames, then combine the plurality of captures in some suitable manner (e.g., by averaging the values of data samples which are in the same locations within the multiple captures) to generate an accumulated capture set of L data samples. In a more specific example, consider that the multi-mode DPD capture circuit 416 is configured to start a capture of 4000 consecutive samples starting at a time that is 20% of the total duration of a frame, as measured from the synchronization signal. The multi-mode DPD capture circuit 416 may acquire such captures for 5 different frames (which may, but do not have to be, consecutive frames) and store the captures in 5 different capture buffers. Then the multi-mode DPD capture circuit 416 may generate sample values for a so-called "accumulated capture buffer" by combining the respective sample values from these captures of different frames: e.g., the first sample value of the accumulated capture buffer may be an average of the first sample values of the 5 different capture buffers for the different frames, the second sample value of the accumulated capture buffer may be an average of the second sample values of the 5 different capture buffers for the different frames, and so on (a combination value other than the "average" may be used in different embodiments). It is then the values of the accumulated capture buffer that will be used by the adaptation circuit 414 to update the model.

In some embodiments, in each of the capture modes, the multi-mode DPD capture circuit 416 may be configured and armed for a single or burst capture by a register-write from a processor subsystem (PS) (where the PS may be implemented in one or more of a processor 2302 shown in FIG. 7, a digital processing unit 2208 shown in FIG. 6, or a control logic 2236 shown in FIG. 6). When armed, the multi-mode DPD capture circuit 416 may be configured to initiate a single capture or a burst of captures from a trigger which can be provided by a register-write from the PS or a signal from an external timing unit. In some embodiments, after the multi-mode DPD capture circuit 416 was operated in the burst mode, the collected statistics may be available in a memory accessed by the PS. In some embodiments, the multi-mode DPD capture circuit 416 may be configured to initiate a memory transfer (e.g., by a direct-memory access (DMA) transfer) to the memory of the PS after each capture is completed. In some embodiments, the multi-mode DPD capture circuit 416 may be configured to assert an interrupt to the PS after each capture is completed.

Once the multi-mode DPD capture circuit 416 acquired one or more captures in any of the modes described herein, the adaptation circuit 414 may use the data samples of the acquired captures to update a model of the nonlinear electronic component based on one or more of these captures. As a result of updating the model, DPD coefficients may be updated and provided from the adaptation circuit 414 to the DPD actuator 412. Then the DPD actuator 412 may apply the DPD coefficients to realize a predistortion of at least a portion of the input signal X, and then provide the predistorted input signal Y to the PA 430. The model formed by the adaptation circuit 414 and the predistortion applied by the DPD actuator 412 may be realized using any suitable conventional DPD algorithms, or portions thereof, but now using captures obtained as described with reference to the functionality of the multi-mode DPD capture circuit 416. The consequence of this is that the (single) estimated gain curve may now be a closer fit on average to dynamic character to the signal and more robust to variations and the evolution of the DPD function, compared to conventional implementations of DPD captures. In this manner, the DPD circuit 410 may pre-emptively correct, in the digital domain, for distortions due to the nonlinearity of the PA 430 (which, essentially, shapes the input signal X before it gets to the PA 430 to counteract the nonlinearity distortions the PA 430 will produce). Since the nonlinear gain compression of the PA 430 may vary over time and operating conditions, the feedback loop from the PA 430 to the receiver 440 and to the DPD circuit 410 can be used to monitor an output of the PA 430 and adapt the model accordingly (i.e., to modify or vary the predistortion applied by the DPD actuator 412).

Example RF Devices and Systems

In some embodiments, DPD using a multi-mode DPD capture circuit as described herein may be included in various RF devices and systems used in wireless communications. For illustration purposes only. One example RF device that may include any of the DPD arrangements described herein is shown in FIG. 6 and described below. However, in general, DPD using a multi-mode DPD capture circuit as described herein may be included in systems other than radio communications, such as in acoustic systems, sonar imaging, or any other systems where beamforming is used and where some components may exhibit nonlinear behavior, all of which being within the scope of the present disclosure.

FIG. 6 is a block diagram of an example RF device 2200, e.g., an RF transceiver, in which DPD using a multi-mode DPD capture circuit as described herein may be implemented, according to some embodiments of the present disclosure.

In general, the RF device 2200 may be any device or system that may support wireless transmission and/or reception of signals in the form of electromagnetic waves in the RF range of approximately 3 kilohertz (kHz) to approximately 300 Gigahertz (GHz). In some embodiments, the RF device 2200 may be used for wireless communications, e.g., in a base station (BS) or a user equipment (UE) device of any suitable cellular wireless communications technology, such as GSM, WCDMA, or LTE. In a further example, the RF device 2200 may be used as, or in, e.g., a BS or a UE device of a millimeter-wave wireless technology such as fifth generation (5G) wireless (i.e., high-frequency/short-wavelength spectrum, e.g., with frequencies in the range between about 20 and 60 GHz, corresponding to wavelengths in the range between about 5 and 15 millimeters). In yet another example, the RF device 2200 may be used for wireless communications using Wi-Fi technology (e.g., a frequency band of 2.4 GHz, corresponding to a wavelength of about 12 cm, or a frequency band of 5.8 GHz, spectrum, corresponding to a wavelength of about 5 cm), e.g., in a Wi-Fi-enabled device such as a desktop, a laptop, a video game console, a smart phone, a tablet, a smart TV, a digital audio player, a car, a printer, etc. In some implementations, a Wi-Fi-enabled device may, e.g., be a node in a smart system configured to communicate data with other nodes, e.g., a smart sensor. Still in another example, the RF device 2200 may be used for wireless communications using Bluetooth technology (e.g., a frequency band from about 2.4 to about 2.485 GHz, corresponding to a wavelength of about 12 cm). In other embodiments, the RF device 2200 may be used for transmitting and/or receiving RF signals for purposes other than communication, e.g., in an automotive radar system, or in medical applications such as MRI.

In various embodiments, the RF device 2200 may be included in FDD or TDD variants of frequency allocations that may be used in a cellular network. In an FDD system, the uplink (i.e., RF signals transmitted from the UE devices to a BS) and the downlink (i.e., RF signals transmitted from the BS to the US devices) may use separate frequency bands at the same time. In a TDD system, the uplink and the downlink may use the same frequencies but at different times.

Several components are illustrated in FIG. 6 as included in the RF device 2200, but any one or more of these components may be omitted or duplicated, as suitable for the application. For example, in some embodiments, the RF device 2200 may be an RF device supporting both of wireless transmission and reception of RF signals (e.g., an RF transceiver), in which case it may include both the components of what is referred to herein as a transmit (TX) path and the components of what is referred to herein as a receive (RX) path. However, in other embodiments, the RF device 2200 may be an RF device supporting only wireless reception (e.g., an RF receiver), in which case it may include the components of the RX path, but not the components of the TX path; or the RF device 2200 may be an RF device supporting only wireless transmission (e.g., an RF transmitter), in which case it may include the components of the TX path, but not the components of the RX path.

In some embodiments, some or all the components included in the RF device 2200 may be attached to one or more motherboards. In some embodiments, some or all these components are fabricated on a single die, e.g., on a single system on chip (SOC) die.

Additionally, in various embodiments, the RF device 2200 may not include one or more of the components illustrated in FIG. 6, but the RF device 2200 may include interface circuitry for coupling to the one or more components. For example, the RF device 2200 may not include an antenna 2202, but may include antenna interface circuitry (e.g., a matching circuitry, a connector and driver circuitry) to which an antenna 2202 may be coupled. In another set of examples, the RF device 2200 may not include a digital processing unit 2208 or a local oscillator 2206, but may include device interface circuitry (e.g., connectors and supporting circuitry) to which a digital processing unit 2208 or a local oscillator 2206 may be coupled.

As shown in FIG. 6, the RF device 2200 may include an antenna 2202, a duplexer 2204 (e.g., if the RF device 2200 is an FDD RF device; otherwise the duplexer 2204 may be omitted), a local oscillator 2206, a digital processing unit 2208. As also shown in FIG. 6, the RF device 2200 may include an RX path that may include an RX path amplifier 2212, an RX path pre-mix filter 2214, a RX path mixer 2216, an RX path post-mix filter 2218, and an ADC 2220. As further shown in FIG. 6, the RF device 2200 may include a TX path that may include a TX path amplifier 2222, a TX path post-mix filter 2224, a TX path mixer 2226, a TX path pre-mix filter 2228, and a DAC 2230. Still further, the RF device 2200 may further include an impedance tuner 2232, an RF switch 2234, and control logic 2236. In various embodiments, the RF device 2200 may include multiple instances of any of the components shown in FIG. 6. In some embodiments, the RX path amplifier 2212, the TX path amplifier 2222, the duplexer 2204, and the RF switch 2234 may be considered to form, or be a part of, an RF front-end (FE) of the RF device 2200. In some embodiments, the RX path amplifier 2212, the TX path amplifier 2222, the duplexer 2204, and the RF switch 2234 may be considered to form, or be a part of, an RF FE of the RF device 2200. In some embodiments, the RX path mixer 2216 and the TX path mixer 2226 (possibly with their associated pre-mix and post-mix filters shown in FIG. 6) may be considered to form, or be a part of, an RF transceiver of the RF device 2200 (or of an RF receiver or an RF transmitter if only RX path or TX path components, respectively, are included in the RF device 2200). In some embodiments, the RF device 2200 may further include one or more control logic elements/circuits, shown in FIG. 6 as control logic 2236, e.g., an RF FE control interface. In some embodiments, the control logic 2236 may be configured to control at least portions of performing DPD using data captures by a multi-mode DPD capture circuit, as described herein, e.g., to help linearize the TX path amplifier 2222 of the RF device 2200 when the TX path amplifier 2222 includes an array of PAs, e.g., an array of PAs similar to the PA 430 as described herein. In some embodiments, the control logic 2236 may be used to perform control other functions within the RF device 2200, e.g., enhance control of complex RF system environment, support implementation of envelope tracking techniques, reduce dissipated power, etc.

The antenna 2202 may be configured to wirelessly transmit and/or receive RF signals in accordance with any wireless standards or protocols, e.g., Wi-Fi, LTE, or GSM, as well as any other wireless protocols that are designated as 3G, 4G, 5G, and beyond. If the RF device 2200 is an FDD transceiver, the antenna 2202 may be configured for concurrent reception and transmission of communication signals in separate, i.e., non-overlapping and non-continuous, bands of frequencies, e.g., in bands having a separation of, e.g., 20 MHz from one another. If the RF device 2200 is a TDD transceiver, the antenna 2202 may be configured for sequential reception and transmission of communication signals in bands of frequencies that may be the same or overlapping for TX and RX paths. In some embodiments, the RF device 2200 may be a multi-band RF device, in which case the antenna 2202 may be configured for concurrent reception of signals having multiple RF components in separate frequency bands and/or configured for concurrent transmission of signals having multiple RF components in separate frequency bands. In such embodiments, the antenna 2202 may be a single wide-band antenna or a plurality of band-specific antennas (i.e., a plurality of antennas each configured to receive and/or transmit signals in a specific band of frequencies). In various embodiments, the antenna 2202 may include a plurality of antenna elements, e.g., a plurality of antenna elements forming a phased antenna array (i.e., a communication system or an array of antennas that may use a plurality of antenna elements and phase shifting to transmit and receive RF signals). Compared to a single-antenna system, a phased antenna array may offer advantages such as increased gain, ability of directional steering, and simultaneous communication. In some embodiments, the RF device 2200 may include more than one antenna 2202 to implement antenna diversity. In some such embodiments, the RF switch 2234 may be deployed to switch between different antennas.

An output of the antenna 2202 may be coupled to the input of the duplexer 2204. The duplexer 2204 may be any suitable component configured for filtering multiple signals to allow for bidirectional communication over a single path between the duplexer 2204 and the antenna 2202. The duplexer 2204 may be configured for providing RX signals to the RX path of the RF device 2200 and for receiving TX signals from the TX path of the RF device 2200.

The RF device 2200 may include one or more local oscillators 2206, configured to provide local oscillator signals that may be used for downconversion of the RF signals received by the antenna 2202 and/or upconversion of the signals to be transmitted by the antenna 2202.

The RF device 2200 may include the digital processing unit 2208, which may include one or more processing devices. The digital processing unit 2208 may be configured to perform various functions related to digital processing of the RX and/or TX signals. Examples of such functions include, but are not limited to, decimation/downsampling, error correction, digital downconversion or upconversion, DC offset cancellation, automatic gain control, etc. Although not shown in FIG. 6, in some embodiments, the RF device 2200 may further include a memory device, configured to cooperate with the digital processing unit 2208.

Turning to the details of the RX path that may be included in the RF device 2200, the RX path amplifier 2212 may include a low-noise amplifier (LNA). An input of the RX path amplifier 2212 may be coupled to an antenna port (not shown) of the antenna 2202, e.g., via the duplexer 2204. The RX path amplifier 2212 may amplify the RF signals received by the antenna 2202.

An output of the RX path amplifier 2212 may be coupled to an input of the RX path pre-mix filter 2214, which may be a harmonic or band-pass (e.g., low-pass) filter, configured to filter received RF signals that have been amplified by the RX path amplifier 2212.

An output of the RX path pre-mix filter 2214 may be coupled to an input of the RX path mixer 2216, also referred to as a downconverter. The RX path mixer 2216 may include two inputs and one output. A first input may be configured to receive the RX signals, which may be current signals, indicative of the signals received by the antenna 2202 (e.g., the first input may receive the output of the RX path pre-mix filter 2214). A second input may be configured to receive local oscillator signals from one of the local oscillators 2206. The RX path mixer 2216 may then mix the signals received at its two inputs to generate a downconverted RX signal, provided at an output of the RX path mixer 2216. As used herein, downconversion refers to a process of mixing a received RF signal with a local oscillator signal to generate a signal of a lower frequency. In particular, the RX path mixer (e.g., downconverter) 2216 may be configured to generate the sum and/or the difference frequency at the output port when two input frequencies are provided at the two input ports. In some embodiments, the RF device 2200 may implement a direct-conversion receiver (DCR), also known as homodyne, synchrodyne, or zero-IF receiver, in which case the RX path mixer 2216 may be configured to demodulate the incoming radio signals using local oscillator signals whose frequency is identical to, or very close to the carrier frequency of the radio signal. In other embodiments, the RF device 2200 may make use of downconversion to an intermediate frequency (IF). IFs may be used in superheterodyne radio receivers, in which a received RF signal is shifted to an IF before the final detection of the information in the received signal is done. Conversion to an IF may be useful for several reasons. For example, when several stages of filters are used, they can all be set to a fixed frequency, which makes them easier to build and to tune. In some embodiments, the RX path mixer 2216 may include several such stages of IF conversion.

Although a single RX path mixer 2216 is shown in the RX path of FIG. 6, in some embodiments, the RX path mixer 2216 may be implemented as a quadrature downconverter, in which case it would include a first RX path mixer and a second RX path mixer. The first RX path mixer may be configured for performing downconversion to generate an in-phase (I) downconverted RX signal by mixing the RX signal received by the antenna 2202 and an in-phase component of the local oscillator signal provided by the local oscillator 2206. The second RX path mixer may be configured for performing downconversion to generate a quadrature (Q) downconverted RX signal by mixing the RX signal received by the antenna 2202 and a quadrature component of the local oscillator signal provided by the local oscillator 2206 (the quadrature component is a component that is offset, in phase, from the in-phase component of the local oscillator signal by 90 degrees). The output of the first RX path mixer may be provided to a I-signal path, and the output of the second RX path mixer may be provided to a Q-signal path, which may be substantially 90 degrees out of phase with the I-signal path.

The output of the RX path mixer 2216 may, optionally, be coupled to the RX path post-mix filter 2218, which may be low-pass filters. In case the RX path mixer 2216 is a quadrature mixer that implements the first and second mixers as described above, the in-phase and quadrature components provided at the outputs of the first and second mixers respectively may be coupled to respective individual first and second RX path post-mix filters included in the filter 2218.

The ADC 2220 may be configured to convert the mixed RX signals from the RX path mixer 2216 from analog to digital domain. The ADC 2220 may be a quadrature ADC that, like the RX path quadrature mixer 2216, may include two ADCs, configured to digitize the downconverted RX path signals separated in in-phase and quadrature components. The output of the ADC 2220 may be provided to the digital processing unit 2208, configured to perform various functions related to digital processing of the RX signals so that information encoded in the RX signals can be extracted.

Turning to the details of the TX path that may be included in the RF device 2200, the digital signal to later be transmitted (TX signal) by the antenna 2202 may be provided, from the digital processing unit 2208, to the DAC 2230. Like the ADC 2220, the DAC 2230 may include two DACs, configured to convert, respectively, digital I- and Q-path TX signal components to analog form.

Optionally, the output of the DAC 2230 may be coupled to the TX path pre-mix filter 2228, which may be a band-pass (e.g., low-pass) filter (or a pair of band-pass, e.g., low-pass, filters, in case of quadrature processing) configured to filter out, from the analog TX signals output by the DAC 2230, the signal components outside of the desired band. The digital TX signals may then be provided to the TX path mixer 2226, which may also be referred to as an upconverter. Like the RX path mixer 2216, the TX path mixer 2226 may include a pair of TX path mixers, for in-phase and quadrature component mixing. Like the first and second RX path mixers that may be included in the RX path, each of the TX path mixers of the TX path mixer 2226 may include two inputs and one output. A first input may receive the TX signal components, converted to the analog form by the respective DAC 2230, which are to be upconverted to generate RF signals to be transmitted. The first TX path mixer may generate an in-phase (I) upconverted signal by mixing the TX signal component converted to analog form by the DAC 2230 with the in-phase component of the TX path local oscillator signal provided from the local oscillator 2206 (in various embodiments, the local oscillator 2206 may include a plurality of different local oscillators, or be configured to provide different local oscillator frequencies for the mixer 2216 in the RX path and the mixer 2226 in the TX path). The second TX path mixer may generate a quadrature phase (Q) upconverted signal by mixing the TX signal component converted to analog form by the DAC 2230 with the quadrature component of the TX path local oscillator signal. The output of the second TX path mixer may be added to the output of the first TX path mixer to create a real RF signal. A second input of each of the TX path mixers may be coupled the local oscillator 2206.

Optionally, the RF device 2200 may include the TX path post-mix filter 2224, configured to filter the output of the TX path mixer 2226.

The TX path amplifier 2222 may include an array of PAs, e.g., an array of PAs similar to the PAs 430, and may be implemented together with any of the DPD arrangements described herein, where DPD using a multi-mode DPD capture circuit may be used to provide predistorted input signals to the TX path amplifier 2222.

In various embodiments, any of the RX path pre-mix filter 2214, the RX path post-mix filter 2218, the TX post-mix filter 2224, and the TX pre-mix filter 2228 may be implemented as RF filters. In some embodiments, an RF filter may be implemented as a plurality of RF filters, or a filter bank. A filter bank may include a plurality of RF filters that may be coupled to a switch, e.g., the RF switch 2234, configured to selectively switch any one of the plurality of RF filters on and off (e.g., activate any one of the plurality of RF filters), in order to achieve desired filtering characteristics of the filter bank (i.e., in order to program the filter bank). For example, such a filter bank may be used to switch between different RF frequency ranges when the RF device 2200 is, or is included in, a BS or in a UE device. In another example, such a filter bank may be programmable to suppress TX leakage on the different duplex distances.

The impedance tuner 2232 may include any suitable circuitry, configured to match the input and output impedances of the different RF circuitries to minimize signal losses in the RF device 2200. For example, the impedance tuner 2232 may include an antenna impedance tuner. Being able to tune the impedance of the antenna 2202 may be particularly advantageous because antenna's impedance is a function of the environment that the RF device 2200 is in, e.g., antenna's impedance changes depending on, e.g., if the antenna is held in a hand, placed on a car roof, etc.

As described above, the RF switch 2234 may be a device configured to route high-frequency signals through transmission paths, e.g., in order to selectively switch between a plurality of instances of any one of the components shown in FIG. 6, e.g., to achieve desired behavior and characteristics of the RF device 2200. For example, in some embodiments, an RF switch may be used to switch between different antennas 2202. In other embodiments, an RF switch may be used to switch between a plurality of RF filters (e.g., by selectively switching RF filters on and off) of the RF device 2200. Typically, an RF system would include a plurality of such RF switches.

The RF device 2200 provides a simplified version and, in further embodiments, other components not specifically shown in FIG. 6 may be included. For example, the RX path of the RF device 2200 may include a current-to-voltage amplifier between the RX path mixer 2216 and the ADC 2220, which may be configured to amplify and convert the downconverted signals to voltage signals. In another example, the RX path of the RF device 2200 may include a balun transformer for generating balanced signals. In yet another example, the RF device 2200 may further include a clock generator, which may, e.g., include a suitable phased-lock loop (PLL), configured to receive a reference clock signal and use it to generate a different clock signal that may then be used for timing the operation of the ADC 2220, the DAC 2230, and/or that may also be used by the local oscillator 2206 to generate the local oscillator signals to be used in the RX path or the TX path.

Example Data Processing System

FIG. 7 provides a block diagram illustrating an example data processing system 2300 that may be configured to control operation of one or more DPD arrangements as described herein, according to some embodiments of the present disclosure. For example, the data processing system 2300 may be configured to implement or control portions of performing DPD using a multi-mode DPD capture circuit as described with reference to FIGS. 1-6, in particular to implement or control portions of DPD arrangements as illustrated in FIGS. 4-5, or any further embodiments of the DPD arrangements as described herein. In another example, the data processing system 2300 may be configured to implement at least portions of the control logic 2236, shown in FIG. 6.

As shown in FIG. 7, the data processing system 2300 may include at least one processor 2302, e.g., a hardware processor 2302, coupled to memory elements 2304 through a system bus 2306. As such, the data processing system may store program code within memory elements 2304. Further, the processor 2302 may execute the program code accessed from the memory elements 2304 via a system bus 2306. In one aspect, the data processing system may be implemented as a computer that is suitable for storing and/or executing program code. It should be appreciated, however, that the data processing system 2300 may be implemented in the form of any system including a processor and a memory that is capable of performing the functions described within this disclosure.

In some embodiments, the processor 2302 can execute software or an algorithm to perform the activities as discussed in the present disclosure, in particular activities related to performing DPD using a multi-mode DPD capture circuit as described herein. The processor 2302 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 2302 may be communicatively coupled to the memory element 2304, for example in a DMA configuration, so that the processor 2302 may read from or write to the memory elements 2304.

In general, the memory elements 2304 may include any suitable volatile or non-volatile memory technology, including double data rate (DDR) RAM, synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 2300 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any elements illustrating DPD arrangements for performing DPD using a multi-mode DPD capture circuit as shown in FIGS. 1-6, can also include suitable interfaces for receiving, transmitting, and/or otherwise communicating data or information in a network environment so that they can communicate with, e.g., the data processing system 2300.

In certain example implementations, mechanisms performing DPD using a multi-mode DPD capture circuit as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 2304 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 2302 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 2304 may include one or more physical memory devices such as, for example, local memory 2308 and one or more bulk storage devices 2310. The local memory may refer to RAM or other non-persistent memory device(s) generally used during actual execution of the program code. A bulk storage device may be implemented as a hard drive or other persistent data storage device. The processing system 2300 may also include one or more cache memories (not shown) that provide temporary storage of at least some program code in order to reduce the number of times program code must be retrieved from the bulk storage device 2310 during execution.

As shown in FIG. 7, the memory elements 2304 may store an application 2318. In various embodiments, the application 2318 may be stored in the local memory 2308, the one or more bulk storage devices 2310, or apart from the local memory and the bulk storage devices. It should be appreciated that the data processing system 2300 may further execute an operating system (not shown in FIG. 7) that can facilitate execution of the application 2318. The application 2318, being implemented in the form of executable program code, can be executed by the data processing system 2300, e.g., by the processor 2302. Responsive to executing the application, the data processing system 2300 may be configured to perform one or more operations or method steps described herein.

Input/output (I/O) devices depicted as an input device 2312 and an output device 2314, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 2314 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 2314. Input and/or output devices 2312, 2314 may be coupled to the data processing system either directly or through intervening I/O controllers.

In an embodiment, the input and the output devices may be implemented as a combined input/output device (illustrated in FIG. 7 with a dashed line surrounding the input device 2312 and the output device 2314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 2316 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 2300, and a data transmitter for transmitting data from the data processing system 2300 to said systems, devices and/or networks. Modems, cable modems, and Ethernet cards are examples of different types of network adapter that may be used with the data processing system 2300.

Example DPD Capture Circuit

Figure 8:
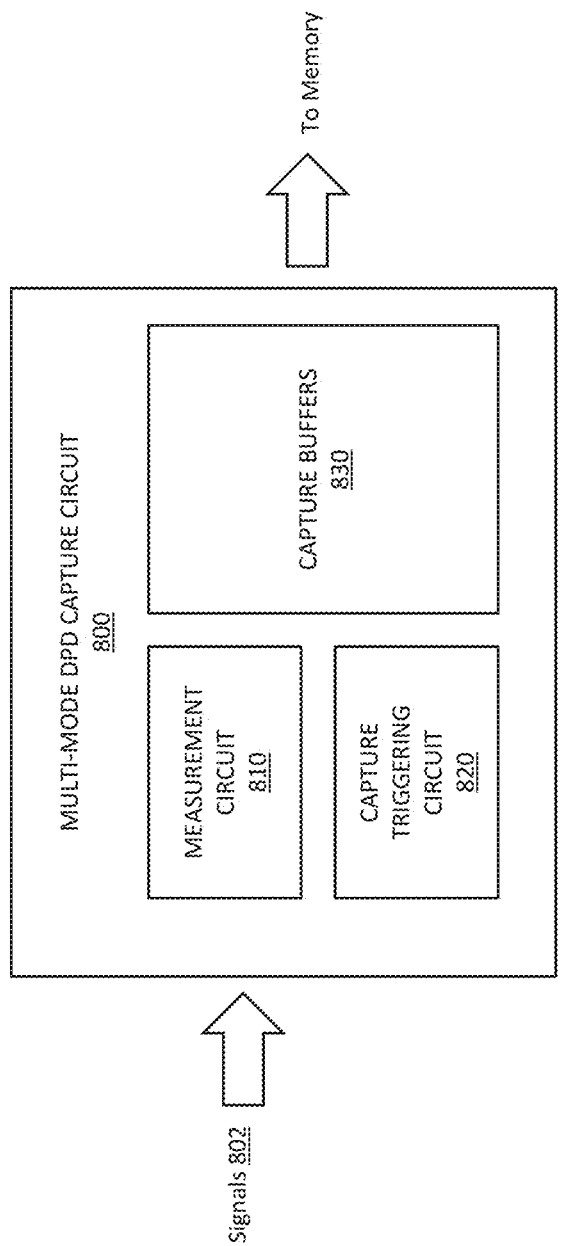
FIG. 8 is a block diagram illustrating an example DPD capture circuit, according to some embodiments of the present disclosure.

FIG. 8 is a block diagram illustrating an example DPD capture circuit 800, according to some embodiments of the present disclosure. The DPD capture circuit 800 may be a hardware unit. In some aspects, the DPD capture circuit 800 may be a digital hardware unit (e.g., including gates, arithmetic logic, hardware state machine, etc.). In some instances, the DPD capture circuit 800 may be integrated as part of an integrated circuit device. In some instances, the DPD capture circuit 800 may be implemented on a FPGA. The DPD capture circuit 800 can be implemented by a communication system such as the communication systems 400 and/or 500 and/or a RF device such as the RF device 2200. In some aspects, the DPD capture circuit 800 may correspond to the multi-mode DPD capture circuit 416 discussed above with reference to FIGS. 4 and/or 5. That is, the DPD capture circuit 800 can be implemented as part of the DPD circuit 410.

The DPD capture circuit 800 can capture data for estimating or updating DPD coefficients. As explained above, data can be captured at various data points associated with a DPD for updating DPD coefficients. For instance, the signals 802 may be a feedback signal (e.g., the feedback signal 431) associated with a nonlinear component (e.g., the PA 430) having a nonlinear distortion in which the DPD is configured to pre-compensate. Further, the DPD capture circuit 800 may capture DPD related data from multiple channels corresponding to different data points of a transmit or receive path or of different transmit/receive data paths. In some aspects, the DPD capture circuit 800 may implement multiple configurable modes for capturing feedback signals from a PA (e.g., the PA 430). The multiple capturing modes may include any suitable combinations of mode 1 to mode 5 as discussed above with reference to FIG. 5. As shown, the DPD capture circuit 800 may include a measurement circuit 820, a capture triggering circuit 810, and one or more capture buffers 830 similar to the capture buffers 502.

The capture triggering circuit 810 may generate triggers for capturing DPD related signals 802 based on a specified capture cycle timing. In some aspects, the capture triggering circuit 810 may trigger capturing of multiple bursts of a DPD signal 802 (e.g., for mode 4) based on a specified capture cycle timing. That is, the capture cycle timing can be programmable. As explained above, the capture cycle timing may specify a number of consecutive data samples or signal samples to capture for each burst. The capture cycle timing may also specify a spacing between the bursts and/or a number of bursts to capture. Such burst captures (spaced apart in time) may have different frequency and/or power content, enabling the DPD capture circuit 800 to assemble a more fully representative data sample. The multiple bursts (the trial captures) may be used for determining statistics of expected captures in the near future, and the determined statistics are then used to set thresholds for finding subsequent captures that meet the thresholds.

For instance, the measurement circuit 820 may compute the statistics from the multiple bursts. The statistics can be related to at least one of a peak power or a mean power. In some aspects, the measurement circuit 820 may include an instantaneous power circuit to compute an instantaneous power of the acquired trial captures and/or a peak location circuit to identify the highest peak in the instantaneous power signal for each of the trial captures. In some aspects, the thresholds for finding a subsequent capture of the signal 802 may include an upper bound threshold peak power, a lower bound threshold peak power, an upper bound threshold mean power, a lower bound threshold mean power, an upper bound threshold number of samples exceeding a threshold, a lower bound threshold number of samples exceeding a threshold or any combination thereof.

In some aspects, the DPD capture circuit 800 may not store the multiple bursts (the trial capture) in the capture buffers 830 (e.g., local RAMs of the DPD capture circuit 800). In other words, the measurement circuit 820 may perform measurements on the multiple bursts in real-time without storing the multiple bursts in the capture buffers 830. After determining the one or more thresholds, the DPD capture circuit 800 may monitor the DPD signal 802 for a subsequent portion of the DPD signal 802 that satisfies the one or more threshold. Stated differently, the DPD capture circuit 800 may monitor the DPD signal 802 until a portion of the DPD signal 802 satisfies the one or more thresholds. Upon detecting the portion of the DPD signal 802 satisfying the one or more thresholds, the DPD capture circuit 800 may stop the monitoring and store the portion of the DPD signal 802 in the capture buffers 830 (e.g., a non-trial capture). That is, the DPD capture circuit 800 may perform "a stop on pass capture" according to the one or more thresholds. Further, in some instances, the DPD capture circuit 800 may store the portion of the DPD signal 802 satisfying the one or more thresholds to a main system memory (e.g., the memory 2308). The transferring of the captured portion of the DPD signal 802 from the capture buffers 830 to the memory can be performed via a DMA engine. In some instances, each capture buffer 830 may be attached to a respective DMA engine.

Subsequently, the portion of the DPD signal 802 satisfying the one or more thresholds can be used for DPD coefficient update. Because of the dynamic nature of the DPD signal 802, utilizing multiple bursts (trial captures) to obtain statistics for setting thresholds for a non-trial capture can advantageously allow capturing of a useful portion of the DPD signal 802 for DPD coefficient update. The useful portion may refer to a portion of the DPD signal 802 that is most representative of DPD errors or DPD behaviors. As such, DPD coefficients may converge to a suitable DPD solution or DPD model faster and/or more accurately, thus the DPD may operate more effectively (to precompensate for nonlinear distortion).

Example DPD Data Capture Method for DPD Adaptation

Figure 9:
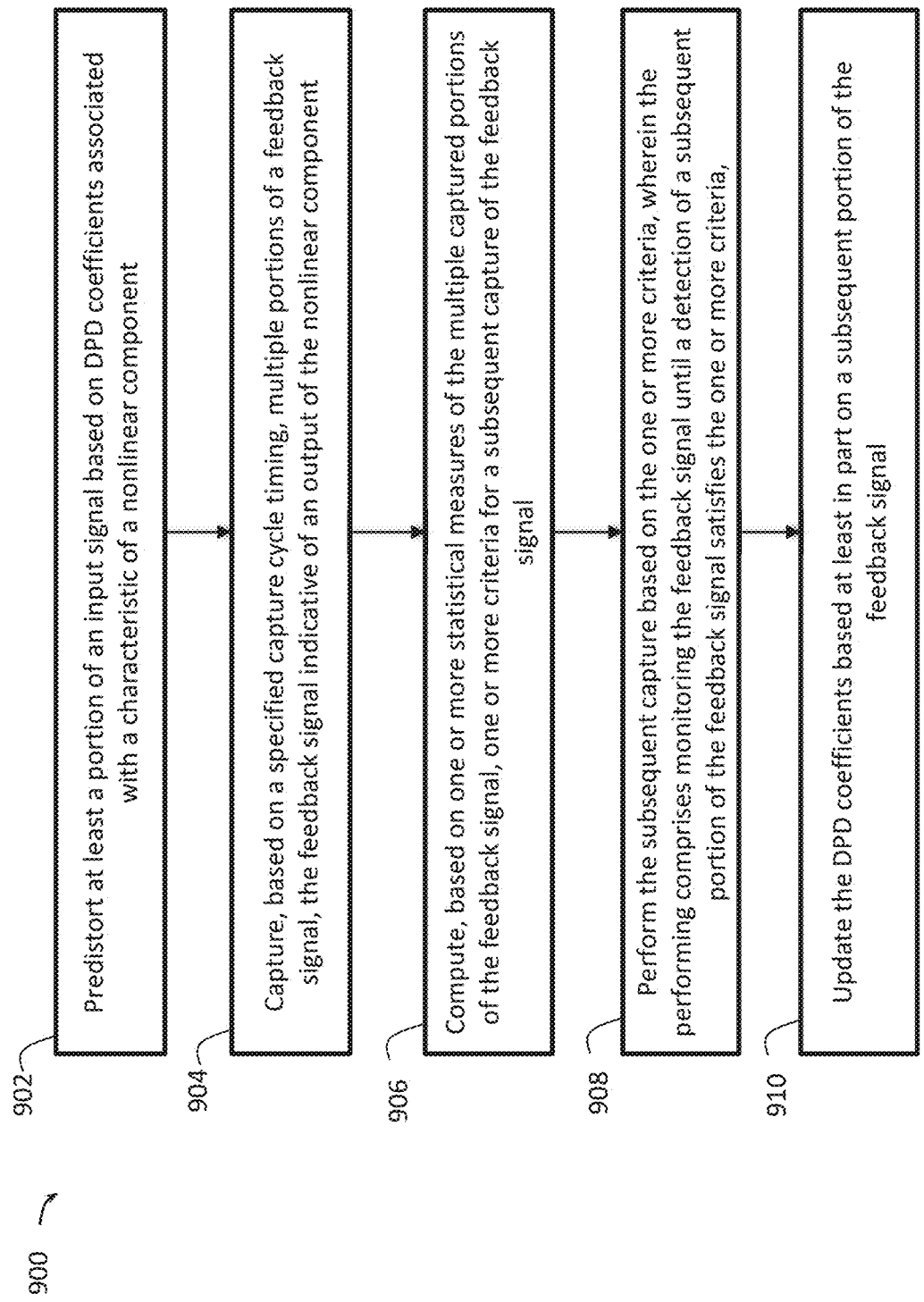
FIG. 9 is a flow diagram of an example method for capturing data for DPD adaptation, according to some embodiments of the present disclosure.

FIG. 9 is a flow diagram of an example method 900 for capturing data for DPD adaptation, according to some embodiments of the present disclosure. The method 900 can be implemented by the communication systems 400 and/or 500, the DPD data capture circuit 800, and/or the RF device 2200 or any suitable wireless devices or RF transceivers. Although the operations of the method 900 may be illustrated with reference to particular embodiments of the communication system 400 and/or 500 and/or the DPD capture circuit 800 disclosed herein, the method 900 may be performed using any suitable hardware components and/or software components. Operations are illustrated once each and in a particular order in FIG. 9, but the operations may be performed in parallel, reordered, and/or repeated as desired.

At 902, at least a portion of an input signal (e.g., $x_n$ in FIG. 4 and/or FIG. 5) is predistorted, using a DPD actuator circuit, based on DPD coefficients associated with a characteristic of a nonlinear component. In some aspects, the DPD actuator circuit may correspond to the DPD actuator 412 discussed above with reference to FIGS. 4 and/or 5. In some aspects, the nonlinear component may be a power amplifier similar to the power amplifier 430.

At 904, multiple portions (or multiple bursts) of a feedback signal (e.g., the feedback signal 431 $z_n$ in FIG. 4 and/or FIG. 5) are captured based on a specified capture cycle timing using a DPD capture circuit, where the feedback signal is indicative of an output of the nonlinear component. In some aspects, the DPD capture circuit may correspond to the multi-mode DPD capture circuit 416 discussed above with reference to FIGS. 4 and/or 5 and/or the DPD data capture circuit 800 discussed above with reference to FIG. 8. In some aspects, the multiple portions may correspond to multiple bursts acquired from the trial captures discussed above with reference to FIGS. 5 and/or 8. In some aspects, the specified capture cycle timing may indicate a number of consecutive samples to be captured for each burst, a spacing (in time) between each burst capture, and/or a number of bursts to capture.

At 906, one or more criteria for a subsequent capture of the feedback signal are computed based on one or more statistical measures of the multiple captured portions of the feedback signal.

At 908, the subsequent capture is performed based on the one or more criteria. In some aspects, performing the subsequent capture may include monitoring the feedback signal until a detection of a subsequent portion of the feedback signal satisfies the one or more criteria. In some aspects, the subsequent capture may correspond to a non-trial capture as discussed above with reference to FIGS. 5 and/or 8.

At 910, the DPD coefficients is updated, using a DPD adaptation circuit, based at least in part on the subsequent portion of the feedback signal. In some aspects, the DPD adaptation circuit may correspond to the DPD adaptation circuit 414 discussed above with reference to FIGS. 4 and/or 5.

In some aspects, the method 900 may further include computing the one or more statistical measures for the multiple portions of the feedback signal, where the one or more statistical measures are associated with at least one of a peak power or a mean power. In some aspects, computing the one or more criteria for monitoring the feedback signal may include computing at least one of an upper bound threshold peak power, a lower bound threshold peak power, an upper bound threshold mean power, a lower bound threshold mean power, an upper bound threshold number of samples exceeding a threshold, and/or a lower bound threshold number of samples exceeding a threshold. Accordingly, performing the subsequent capture at 908 may include monitoring the feedback signal to find a subsequent portion of the feedback signal (for adapting the DPD coefficients) that satisfies one or more of these thresholds or a combination of two or more of these thresholds. As an example, the monitoring may include a mean power threshold comparison (e.g., comparing a mean power of the portion to the upper bound threshold mean power and/or the lower bound threshold mean power) and a peak power threshold comparison (e.g., comparing a peak power of the portion to the upper bound threshold peak power and/or the lower bound threshold peak power). As another example, the monitoring may include a mean power threshold comparison (e.g., comparing a mean power of the portion to the upper bound threshold mean power and/or the lower bound threshold mean power) and a number of samples comparison (e.g., comparing a number of samples in the portion exceeding a certain threshold to the upper bound threshold number of samples exceeding the certain threshold and/or the lower bound threshold number of samples exceeding the certain threshold). As a further example, the monitoring may include a peak power threshold comparison (e.g., comparing a peak power of the portion to the upper bound threshold peak power and/or the lower bound threshold peak power) and a number of samples comparison (e.g., comparing a number of samples in the portion exceeding a certain threshold to the upper bound threshold number of samples exceeding the certain threshold and/or the lower bound threshold number of samples exceeding the certain threshold). In general, the criteria or thresholds for finding a subsequent portion of the feedback signal (for adapting the DPD coefficients) may be associated with a mean power, a peak power, and/or a number of samples exceeding a certain threshold.

In some aspects, the method 900 may further include triggering the capturing of the multiple portions of the feedback signal responsive to a register value (e.g., a register-write operation).

In some aspects, the method 900 may further include storing, at a memory (e.g., the memory 2308), the subsequent portion of the feedback signal based the subsequent portion of the feedback signal satisfying the one or more criteria. In some aspects, the method 900 may further include refraining from storing, at the memory, the multiple portions of the feedback signal captured for computing the one or more statistical measures.

EXAMPLES

Example 1 includes a digital predistortion (DPD) arrangement. The DPD arrangement includes a DPD actuator circuit, configured to use DPD coefficients (θ) to perform a predistortion of an input signal (x) to generate a predistorted signal (u); a DPD adaptation circuit, configured to update the DPD coefficients (θ) based on a model of a power amplifier (PA); and a multi-mode DPD capture circuit, configured to acquire one or more captures of a feedback signal, the feedback signal indicative of an output of the PA, where the one or more captures are to be used to update the model of the PA, wherein the multi-mode DPD capture circuit is configured to operate in one of a plurality of modes.

In Example 2, the DPD arrangement according to Example 1 can optionally include wherein the plurality of modes includes a mode where the multi-mode DPD capture circuit places a peak sample power of a capture window in a center of a capture buffer.

In Example 3, the DPD arrangement according to Examples 1 or 2 can optionally include wherein the plurality of modes includes a mode where the multi-mode DPD capture circuit synchronizes the peak window start with a frame at a programmed offset.

In Example 4, the DPD arrangement according to any one of Examples 1-3 can optionally include wherein the plurality of modes includes a mode where the multi-mode DPD capture circuit decimates data prior to storing the one or more captures in one or more capture buffers.

In Example 5, the DPD arrangement according to any one of Examples 1-4 can optionally include wherein the plurality of modes include a mode where the multi-mode DPD capture circuit performs multiple capture cycles to compute one or more characteristics of data and set one or more thresholds for subsequent captures.

In Example 6, the DPD arrangement according to any one of Examples 1-5, wherein the plurality of modes includes a mode where the multi-mode DPD capture circuit accumulates samples over multiple captures.

Example 7 includes an RF device, e.g., an RF transceiver or a portion thereof, that includes a PA and a DPD arrangement according to any one of the Examples 1-6.

In Example 8, the RF device according to Example 7 can optionally include at least one antenna.

In Example 9, the RF device according to Examples 7 or 8 can optionally include a control logic configured to control operation of the DPD arrangement.

In Example 10, the RF device according to any one of Examples 7-9 can optionally include wherein the RF device is a mobile device (e.g., a UE of a wireless cellular network).

In Example 11, the RF device according to any one of Examples 7-9 can optionally include wherein the RF device is a BS of a wireless cellular network or a transmitter of a cable communications network.

Example 12 includes a non-transitory computer-readable storage medium, storing computer-readable instructions which, when executed by a processor, are configured to control operation of the DPD arrangement or an RF device according to any one of Examples 1-11.

Example 13 includes a digital predistortion (DPD) arrangement. The DPD arrangement includes a DPD actuator circuit to predistort, using DPD coefficients, at least a portion of an input signal, the DPD coefficients associated with a characteristic of a nonlinear component; a DPD capture circuit to perform, based on a capture cycle timing, multiple captures of a feedback signal, the feedback signal indicative of an output of the nonlinear component; compute, based on one or more characteristics of the multiple captures, one or more criteria for a subsequent capture of the feedback signal; and perform, based on the one or more criteria, the subsequent capture of the feedback signal; and a DPD adaptation circuit to update the DPD coefficients based at least in part on the subsequent capture.

In Example 14, the DPD arrangement according to Example 13 can optionally include where the DPD capture circuit further computes the one or more characteristics for the multiple captures.

In Example 15, the DPD arrangement according to any of Examples 13-14 can optionally include where the one or more characteristics of the multiple captures includes a statistical measure associated with at least one of a peak power or a mean power.

In Example 16, the DPD arrangement according to any of Examples 13-15 can optionally include where the DPD capture circuit further stores, at a memory, the statistical measure associated with the at least one of the peak power or the mean power.

In Example 17, the DPD arrangement according to any of Examples 13-16 can optionally include where the DPD capture circuit computes the one or more criteria by setting one or more thresholds for the subsequent capture based on the one or more characteristic for the multiple captures.

In Example 18, the DPD arrangement according to any of Examples 13-17 can optionally include where the one or more thresholds for the subsequent capture includes at least one of an upper bound threshold peak power; a lower bound threshold peak power; an upper bound threshold mean power; a lower bound threshold mean power; an upper bound threshold number of samples exceeding a first threshold; or a lower bound threshold number of samples exceeding a second threshold.

In Example 19, the DPD arrangement according to any of Examples 13-18 can optionally include where the DPD capture circuit performs the subsequent capture based on the one or more criteria by monitoring the feedback signal until a portion of the feedback signal satisfies the one or more criteria.

In Example 20, the DPD arrangement according to any of Examples 13-19 can optionally include where the DPD adaptation circuit updates the DPD coefficients further based on the portion of the feedback signal that satisfies the one or more criteria.

In Example 21, the DPD arrangement according to any of Examples 13-20 can optionally include where the DPD capture circuit further stops the subsequent capture based on a detection of the portion of the feedback signal satisfying the one or more criteria.

In Example 22, the DPD arrangement according to any of Examples 13-21 can optionally include where the DPD capture circuit further stores, at a memory, the portion of the feedback signal satisfying the one or more criteria.

Example 23 includes a radio frequency (RF) device including a nonlinear component; a digital predistortion (DPD) actuator circuit to predistort, using DPD coefficients, at least a portion of an input signal, the DPD coefficients associated with a characteristic of the nonlinear component; a DPD capture circuit to capture, based on a specified capture cycle timing, multiple bursts of a feedback signal, the feedback signal indicative of an output of the nonlinear component; compute, based on the multiple bursts, one or more statistical measures for determining one or more thresholds for a subsequent capture; and perform the subsequent capture by monitoring the feedback signal for a subsequent portion of the feedback signal that satisfies the one or more thresholds; and a DPD adaptation circuit to update the DPD coefficients based at least in part on the subsequent portion of the feedback signal that satisfies the one or more thresholds.

In Example 24, the RF device according to Example 23 can optionally include where the DPD capture circuit further determines, based on the one or more computed statistical measures of the multiple bursts of the feedback signal, the one or more thresholds for the subsequent capture of the feedback signal.

In Example 25, the RF device according to any of Examples 23-24 can optionally include where the one or more thresholds for the subsequent capture of the feedback signal includes at least one of an upper bound threshold peak power; a lower bound threshold peak power; an upper bound threshold mean power; a lower bound threshold mean power; an upper bound threshold number of samples exceeding a first threshold; or a lower bound threshold number of samples exceeding a second threshold.

In Example 26, the RF device according to any of Examples 23-25 can optionally include where the DPD capture circuit includes a capture triggering circuit to trigger, based on the specified capture cycle timing, capturing of the multiple bursts of the feedback signal; and a measurement circuit to compute, based on the multiple bursts, the one or more statistical measures for determining the one or more thresholds for the subsequent capture.

Example 27 includes a method for performing digital predistortion (DPD), the method including predistorting, using a DPD actuator circuit, at least a portion of an input signal based on DPD coefficients associated with a characteristic of a nonlinear component; capturing, based on a specified capture cycle timing using a DPD capture circuit, multiple portions of a feedback signal, the feedback signal indicative of an output of the nonlinear component; computing, based on one or more statistical measures of the multiple captured portions of the feedback signal, one or more criteria for a subsequent capture of the feedback signal; performing the subsequent capture based on the one or more criteria, where the performing includes monitoring the feedback signal until a detection of a subsequent portion of the feedback signal satisfies the one or more criteria; and updating, using a DPD adaptation circuit, the DPD coefficients based at least in part on the subsequent portion of the feedback signal.

In Example 28, the method according to Example 27 can optionally include computing the one or more statistical measures for the multiple portions of the feedback signal, where the one or more statistical measures are associated with at least one of a peak power or a mean power.

In Example 29, the method according to any of Examples 27-28 can optionally include where the computing the one or more criteria for monitoring the feedback signal includes computing at least one of an upper bound threshold peak power; a lower bound threshold peak power; an upper bound threshold mean power; a lower bound threshold mean power; an upper bound threshold number of samples exceeding a threshold; or a lower bound threshold number of samples exceeding a threshold.

In Example 30, the method according to any of Examples 27-29 can optionally include triggering the capturing of the multiple portions of the feedback signal responsive to a register value.

In Example 31, the method according to any of Examples 27-30 can optionally include storing, at a memory, the subsequent portion of the feedback signal based the subsequent portion of the feedback signal satisfying the one or more criteria.

In Example 32, the method according to any of Examples 27-31 can optionally include refraining from storing, at a memory, the multiple portions of the feedback signal captured for computing the one or more statistical measures.

Variations and Implementations

While embodiments of the present disclosure were described above with references to exemplary implementations as shown in FIGS. 1-9, a person skilled in the art will realize that the various teachings described above are applicable to a large variety of other implementations. For example, descriptions provided herein are applicable not only to 5G systems, which provide one example of wireless communication systems, but also to other wireless communication systems such as, but not limited to, Wi-Fi technology or Bluetooth technology. In yet another example, descriptions provided herein are applicable not only to wireless communication systems, but also to any other systems where amplifiers may be used, such as radar systems, automotive radar, and cable communication systems (e.g., cable television systems, etc.).

In certain contexts, the features discussed herein can be applicable to automotive systems, medical systems, scientific instrumentation, wireless and wired communications, radio, radar, and digital-processing-based systems.

In the discussions of the embodiments above, components of a system, such as phase shifters, frequency mixers, transistors, resistors, capacitors, amplifiers, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to performing DPD using a multi-mode DPD capture circuit as described herein.

Parts of various systems for performing DPD using a multi-mode DPD capture circuit, as proposed herein, can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a SOC package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in the systems of FIGS. 1-9) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present drawings may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

It is also important to note that the functions related to performing DPD using a multi-mode DPD capture circuit as proposed herein illustrate only some of the possible functions that may be executed by, or within, RF systems. Some of these operations may be deleted or removed where appropriate, or these operations may be modified or changed considerably without departing from the scope of the present disclosure. Substantial flexibility is provided by embodiments described herein in that any suitable arrangements, chronologies, configurations, and timing mechanisms may be provided without departing from the teachings of the present disclosure.

The invention claimed is:

1. A digital predistortion (DPD) arrangement, the DPD arrangement comprising:
a DPD actuator circuit to predistort, using DPD coefficients, at least a portion of an input signal, the DPD coefficients associated with a characteristic of a nonlinear component;
a DPD capture circuit to:
capture, based on a capture cycle timing, multiple portions of a feedback signal, the feedback signal indicative of an output of the nonlinear component;
compute, based on one or more characteristics of the multiple captured portions, one or more criteria for a subsequent capture of the feedback signal; and
perform, based on the one or more criteria, the subsequent capture by capturing a subsequent portion of the feedback signal that satisfies the one or more criteria; and
a DPD adaptation circuit to update the DPD coefficients based at least in part on the subsequent capture.

2. The DPD arrangement of claim 1, wherein the DPD capture circuit further computes the one or more characteristics for the multiple captured portions.

3. The DPD arrangement of claim 1, wherein the one or more characteristics of the multiple captured portions comprise a statistical measure associated with at least one of a peak power or a mean power.

4. The DPD arrangement of claim 3, wherein the DPD capture circuit further stores, at a memory, the statistical measure associated with the at least one of the peak power or the mean power.

5. The DPD arrangement of claim 1, wherein the DPD capture circuit computes the one or more criteria by setting one or more thresholds for the subsequent capture based on the one or more characteristic for the multiple captured portions.

6. The DPD arrangement of claim 5, wherein the one or more thresholds for the subsequent capture comprises at least one of:
an upper bound threshold peak power;
a lower bound threshold peak power;
an upper bound threshold mean power;
a lower bound threshold mean power;
an upper bound threshold number of samples exceeding a first threshold; or
a lower bound threshold number of samples exceeding a second threshold.

7. The DPD arrangement of claim 1, wherein the DPD capture circuit performs the subsequent capture based on the one or more criteria by:
monitoring the feedback signal until a portion of the feedback signal satisfies the one or more criteria.

8. The DPD arrangement of claim 7, wherein the DPD adaptation circuit updates the DPD coefficients further based on the portion of the feedback signal that satisfies the one or more criteria.

9. The DPD arrangement of claim 7, wherein the DPD capture circuit further stops the subsequent capture based on a detection of the portion of the feedback signal satisfying the one or more criteria.

10. The DPD arrangement of claim 7, wherein the DPD capture circuit further stores, at a memory, the portion of the feedback signal satisfying the one or more criteria.

11. A radio frequency (RF) device comprising:
a nonlinear component;
a digital predistortion (DPD) actuator circuit to predistort, using DPD coefficients, at least a portion of an input signal, the DPD coefficients associated with a characteristic of the nonlinear component;
a DPD capture circuit to:
capture, based on a specified capture cycle timing, multiple bursts of a feedback signal, the feedback signal indicative of an output of the nonlinear component;
compute, based on the multiple bursts, one or more statistical measures for determining one or more thresholds for a subsequent capture; and
perform the subsequent capture by monitoring the feedback signal for a subsequent portion of the feedback signal that satisfies the one or more thresholds; and
a DPD adaptation circuit to update the DPD coefficients based at least in part on the subsequent portion of the feedback signal that satisfies the one or more thresholds.

12. The RF device of claim 11, wherein the DPD capture circuit further determines, based on the one or more computed statistical measures of the multiple bursts of the feedback signal, the one or more thresholds for the subsequent capture of the feedback signal.

13. The RF device of claim 12, wherein the one or more thresholds for the subsequent capture of the feedback signal comprises at least one of:
an upper bound threshold peak power;
a lower bound threshold peak power;
an upper bound threshold mean power;
a lower bound threshold mean power;
an upper bound threshold number of samples exceeding a first threshold; or
a lower bound threshold number of samples exceeding a second threshold.

14. The RF device of claim 12, wherein the DPD capture circuit comprises:
a capture triggering circuit to trigger, based on the specified capture cycle timing, capturing of the multiple bursts of the feedback signal; and
a measurement circuit to compute, based on the multiple bursts, the one or more statistical measures for determining the one or more thresholds for the subsequent capture.

15. A method for performing digital predistortion (DPD), the method comprising:
predistorting, using a DPD actuator circuit, at least a portion of an input signal based on DPD coefficients associated with a characteristic of a nonlinear component;
capturing, based on a specified capture cycle timing using a DPD capture circuit, multiple portions of a feedback signal, the feedback signal indicative of an output of the nonlinear component;
computing, based on one or more statistical measures of the multiple captured portions of the feedback signal, one or more criteria for a subsequent capture of the feedback signal;
performing the subsequent capture based on the one or more criteria, wherein the performing comprises monitoring the feedback signal until a detection of a subsequent portion of the feedback signal satisfies the one or more criteria; and
updating, using a DPD adaptation circuit, the DPD coefficients based at least in part on the subsequent portion of the feedback signal.

16. The method of claim 15, further comprising:
computing the one or more statistical measures for the multiple portions of the feedback signal,
wherein the one or more statistical measures are associated with at least one of a peak power or a mean power.

17. The method of claim 15, wherein the computing the one or more criteria for monitoring the feedback signal comprises computing at least one of:
an upper bound threshold peak power;
a lower bound threshold peak power;
an upper bound threshold mean power;
a lower bound threshold mean power;
an upper bound threshold number of samples exceeding a threshold; or
a lower bound threshold number of samples exceeding a threshold.

18. The method of claim 15, further comprising:
triggering the capturing of the multiple portions of the feedback signal responsive to a register value.

19. The method of claim 15, further comprising:
storing, at a memory, the subsequent portion of the feedback signal based the subsequent portion of the feedback signal satisfying the one or more criteria.

20. The method of claim 15, further comprising:
refraining from storing, at a memory, the multiple portions of the feedback signal captured for computing the one or more statistical measures.

* * * * *